(12) United States Patent
Ballani et al.

(10) Patent No.: US 11,539,453 B2
(45) Date of Patent: Dec. 27, 2022

(54) EFFICIENTLY INTERCONNECTING A PLURALITY OF COMPUTING NODES TO FORM A CIRCUIT-SWITCHED NETWORK

(71) Applicant: Microsoft Technology Licensing, LLC, Redmond, WA (US)

(72) Inventors: Hitesh Ballani, Cambridge (GB); Christian L. Belady, Mercer Island, WA (US); Lisa Ru-Feng Hsu, Durham, NC (US); Winston Allen Saunders, Seattle, WA (US); Paolo Costa, London (GB); Douglas M. Carmean, Seattle, WA (US); Kai Shi, Cambridge (GB); Charles Boecker, Ames, IA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/173,052

(22) Filed: Feb. 10, 2021

(65) Prior Publication Data

US 2022/0140934 A1    May 5, 2022

Related U.S. Application Data

(60) Provisional application No. 63/109,276, filed on Nov. 3, 2020.

(51) Int. Cl.
*H04B 10/00* (2013.01)
*H04J 14/02* (2006.01)
*H04J 14/00* (2006.01)

(52) U.S. Cl.
CPC ...... *H04J 14/0267* (2013.01); *H04J 14/0212* (2013.01); *H04J 14/0223* (2013.01); *H04J 14/0241* (2013.01)

(58) Field of Classification Search
CPC ... H04B 10/27; H04B 10/272; H04B 10/2725
See application file for complete search history.

(56) References Cited

U.S. PATENT DOCUMENTS

| | | | |
|---|---|---|---|
| 4,695,999 | A | 9/1987 | Lebizay |
| 5,296,950 | A | 3/1994 | Lin et al. |

(Continued)

FOREIGN PATENT DOCUMENTS

| | | |
|---|---|---|
| EP | 0311772 A2 | 4/1989 |
| WO | 2017011649 A1 | 1/2017 |

OTHER PUBLICATIONS

"Non Final Office Action Issued in U.S. Appl. No. 16/917,829", dated Dec. 16, 2020, 19 Pages.

(Continued)

*Primary Examiner* — Daniel G Dobson
(74) *Attorney, Agent, or Firm* — Ray Quinney & Nebeker P.C; James Bullough

(57) ABSTRACT

A system for interconnecting a plurality of computing nodes includes a plurality of optical circuit switches and a plurality of electrical circuit switches. A first network stage comprises a first plurality of circuit switches selected from among the plurality of optical circuit switches and the plurality of electrical circuit switches. Each computing node among the plurality of computing nodes is optically coupled to at least one of the first plurality of circuit switches. A second network stage comprises a second plurality of circuit switches selected from among the plurality of optical circuit switches and the plurality of electrical circuit switches. Each circuit switch among the first plurality of circuit switches is optically coupled to each circuit switch among the second plurality of optical circuit switches.

20 Claims, 10 Drawing Sheets

(56) References Cited

U.S. PATENT DOCUMENTS

| | | | |
|---|---|---|---|
| 5,943,150 | A | 8/1999 | Deri et al. |
| 6,795,655 | B1 | 9/2004 | Sidorovich et al. |
| 8,655,187 | B2 | 2/2014 | Davidson et al. |
| 8,659,895 | B1 | 2/2014 | Carlson et al. |
| 8,954,698 | B2 | 2/2015 | Schenfeld et al. |
| 9,332,323 | B2 | 5/2016 | Zhang et al. |
| 9,520,961 | B2 | 12/2016 | Xia et al. |
| 9,696,538 | B2 | 7/2017 | Katayama et al. |
| 9,712,901 | B2 | 7/2017 | Zhang et al. |
| 10,467,021 | B2 | 11/2019 | Nguyen et al. |
| 10,491,302 | B1 | 11/2019 | Morris et al. |
| 10,552,227 | B2 | 2/2020 | Altstaetter et al. |
| 2003/0091267 | A1 | 5/2003 | Alvarez et al. |
| 2004/0156640 | A1 | 8/2004 | Dress et al. |
| 2005/0013311 | A1 | 1/2005 | Samudrala et al. |
| 2008/0008471 | A1 | 1/2008 | Dress |
| 2008/0008472 | A1 | 1/2008 | Dress et al. |
| 2012/0124590 | A1 | 5/2012 | Balakrishnan et al. |
| 2013/0156425 | A1 | 6/2013 | Kirkpatrick et al. |
| 2013/0182620 | A1 | 7/2013 | Chaffee et al. |
| 2013/0287397 | A1 | 10/2013 | Frankel et al. |
| 2014/0280687 | A1 | 9/2014 | Egi et al. |
| 2015/0280827 | A1 | 10/2015 | Adiletta et al. |
| 2016/0091685 | A1 | 3/2016 | Raza et al. |
| 2016/0261364 | A1* | 9/2016 | Jiang .................. H04B 10/503 |
| 2016/0301996 | A1* | 10/2016 | Morris ............... H04Q 11/0003 |
| 2017/0237971 | A1 | 8/2017 | Pitts |
| 2017/0257970 | A1 | 9/2017 | Alleman et al. |
| 2018/0287818 | A1 | 10/2018 | Goel et al. |
| 2019/0235929 | A1 | 8/2019 | Altstaetter et al. |
| 2019/0245924 | A1* | 8/2019 | Li ......................... G06F 3/0605 |
| 2020/0003970 | A1* | 1/2020 | Marchetti ................. G03F 7/26 |
| 2021/0409848 | A1 | 12/2021 | Saunders et al. |
| 2022/0141558 | A1 | 5/2022 | Ballani et al. |

OTHER PUBLICATIONS

"Non Final Office Action Issued in U.S. Appl. No. 16/917,875", dated Jan. 14, 2021, 13 Pages.
Chaintoutis, et al., "Free Space Intra-Datacenter Interconnects Based on 2D Optical Beam Steering Enabled by Photonic Integrated Circuits", In Journal of Photonics, vol. 5, No. 3, Multidisciplinary Digital Publishing Institute, Aug. 1, 2018, 10 Pages.
Cheng, et al., "Photonic switching in high performance datacenters", In Journal of Optics Express, vol. 26, No. 12, Jun. 11, 2018, pp. 16022-16043.
Curran, et al., "Providing Line-of-Sight in a Free-Space-Optics Based Data Center Architecture", In Proceedings IEEE International Conference on Communications (ICC), May 22, 2016, 7 Pages.
Hamedazimi, et al., "Firefly: A Reconfigurable Wireless Data Center Fabric Using Free-Space Optics", In Proceedings of the ACM conference on SIGCOMM, Aug. 17, 2014, pp. 319-330.
Hirabayashi, et al., "Optical Beam Direction Compensating System for Board-to-Board Free Space Optical Interconnection in High-Capacity ATM Switch", In Journal of lightwave technology, vol. 15, No. 5, May 1997, pp. 874-882.
Hu, et al., "Towards Tightly-Coupled Datacenter with Free-Space Optical Links", In Proceedings of the International Conference on Cloud and Big Data Computing, Sep. 17, 2017, pp. 33-39.
Kachris, et al., "A Survey on Optical Interconnects for Data Centers", In Journal of IEEE Communications Surveys & Tutorials, vol. 14, Issue 4, Jan. 11, 2012, pp. 1021-1036.
Lin, et al., "Free-Space Micromachined Optical Switches for Optical Networking", In Journal of selected topics in Quantum Electronics, IEEE, vol. 5, No. 1, Jan. 1999, pp. 4-9.
Saljoghei, et al., "MCF-SMF Hybrid Low-Latency Circuit-Switched Optical Network for Disaggregated Data Centers", In Journal of Lightwave Technology, vol. 37, No. 16, Aug. 15, 2019, pp. 4017-4029.
Shrivastav, et al., "Shoal: A Network Architecture for Disaggregated Racks", In 16th {USENIX} Symposium on Networked Systems Design and Implementation, Feb. 26, 2019, 16 Pages.
U.S. Appl. No. 63/109,276, dated Nov. 3, 2020.
U.S. Appl. No. 17/243,534, dated Apr. 28, 2021.
U.S. Appl. No. 63/109,259, dated Nov. 3, 2020.
U.S. Appl. No. 17/461,758, dated Aug. 30, 2021.
U.S. Appl. No. 16/917, 875, dated Jun. 30, 2020.
U.S. Appl. No. 17/536,405, dated Nov. 29, 2021.
Fujiwara, et al., "Augmenting Low-Latency HPC Network with Free-Space Optical Links", In IEEE 21st International Symposium on High Performance Computer Architecture, Feb. 7, 2015, pp. 390-401.
Hamza, et al., "Wireless Communication in Data Centers: A Survey", In Proceedings of the IEEE Communications Surveys & Tutorials, vol. 18, Issue 3, Jan. 26, 2016, pp. 1572-1595.
"International Search Report and Written Opinion Issued in PCT Application No. PCT/US21/030770", dated Aug. 10, 2021, 14 Pages.
"International Search Report and Written Opinion Issued in PCT Application No. PCT/US21/034683", dated Sep. 28, 2021, 13 Pages.
Ali, et al., "Price/Cooling Aware and Delay Sensitive Scheduling in Geographically Distributed Data Centers", In Proceedings of IEEE/IFIP Network Operations and Management Symposium, Apr. 25, 2016, pp. 1025-1030.
Arnon, Shlomi, "Next-Generation Optical Wireless Communications for Data Centers", In Proceedings of IEEE International Society for Optics and Photonics, vol. 9387, Feb. 7, 2015, 7 Pages.
Farrington, et al., "Helios: A Hybrid Electrical/Optical Switch Architecture for Modular Data Centres", In Proceedings of ACM SIGCOMM Computer Communication Review, vol. 40, Issue 4, Aug. 30, 2010, pp. 339-350.
Imran, et al., "HOSA: Hybrid Optical Switch Architecture for Data Center Networks", In Proceedings of the 12th ACM International Conference on Computing Frontiers, May 18, 2015, 8 Pages.
Wang, et al., "c-Through: Part-Time Optics in Data Centers", In Proceedings of ACM SIGCOMM Computer Communication Review, vol. 40, Issue 4, Aug. 30, 2010, pp. 327-338.
"International Search Report and Written Opinion Issued in PCT Application No. PCT/US21/053869", dated Jan. 18, 2022, 11 Pages.
Ishii, et al., Toward Exa-Scale Optical Circuit Switch Interconnect Networks for Future Datacenter/HPC, In Proceedings of International Society for Optics and Photonics, vol. 10131, Jan. 28, 2017, 9 Pages.
"International Search Report and Written Opinion Issued in PCT Application No. PCT/US2021/057827", dated Feb. 14, 2022, 14 Pages.
"Notice of Allowance Issued in U.S. Appl. No. 16/917,829", dated Jun. 3, 2022, 15 Pages.

\* cited by examiner

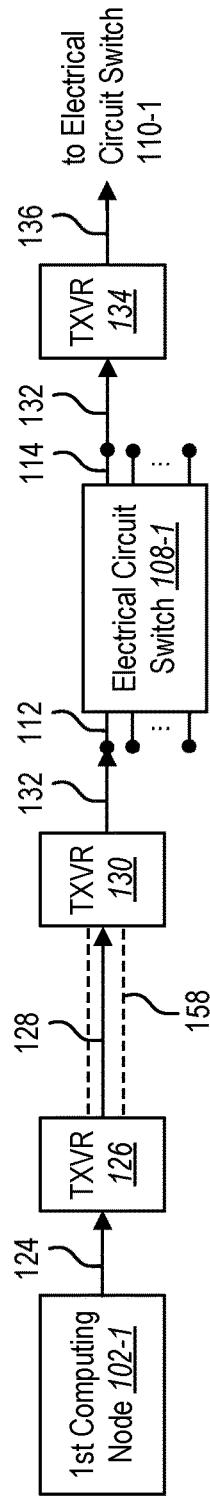
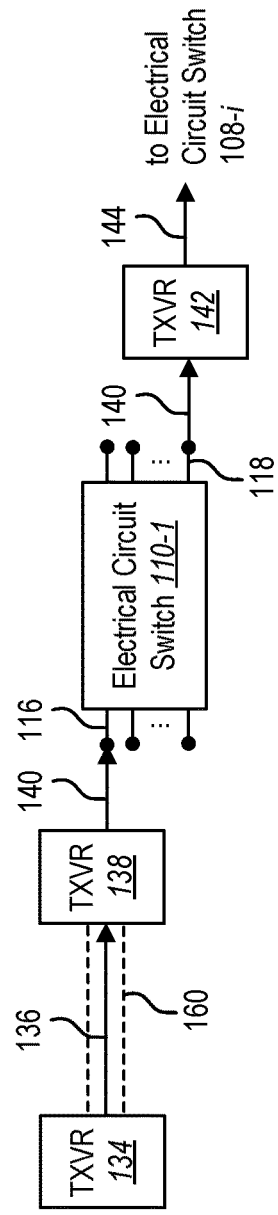
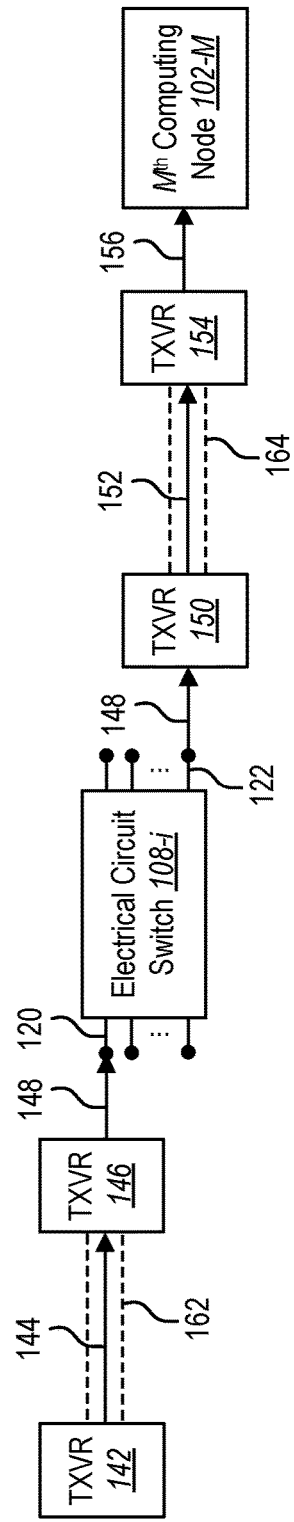
FIG. 1A
FIG. 1B
FIG. 1C

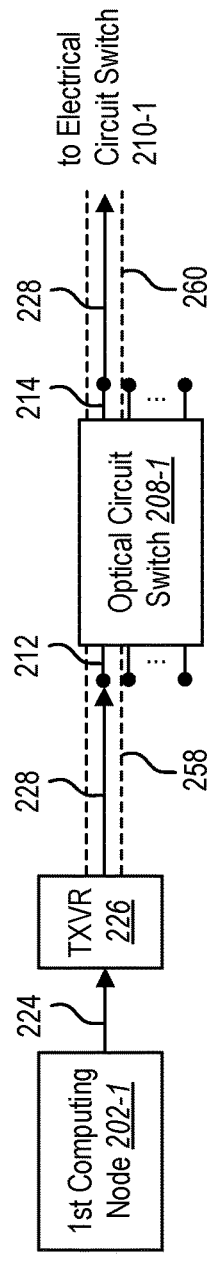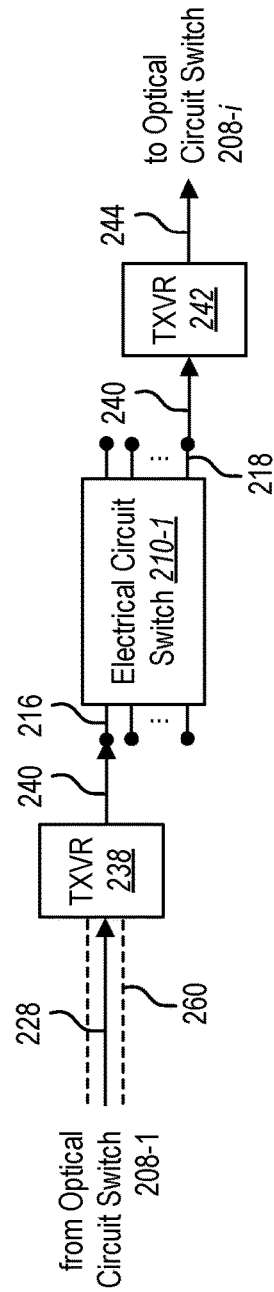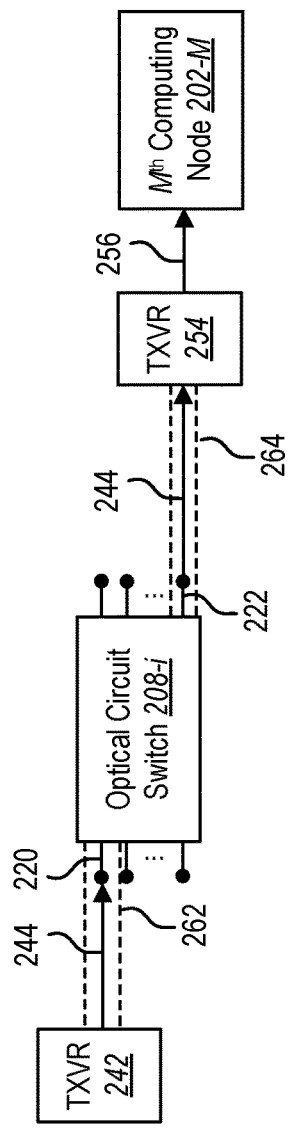

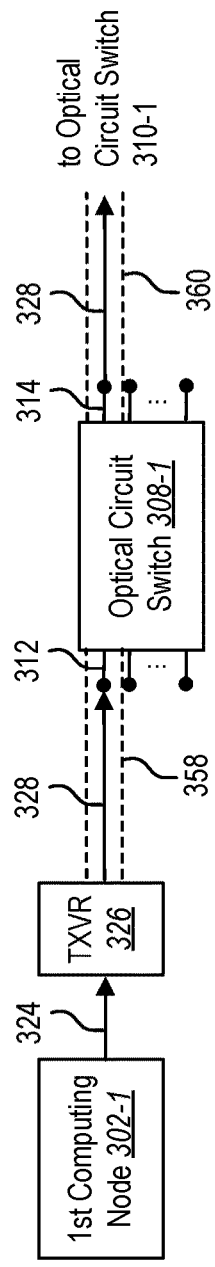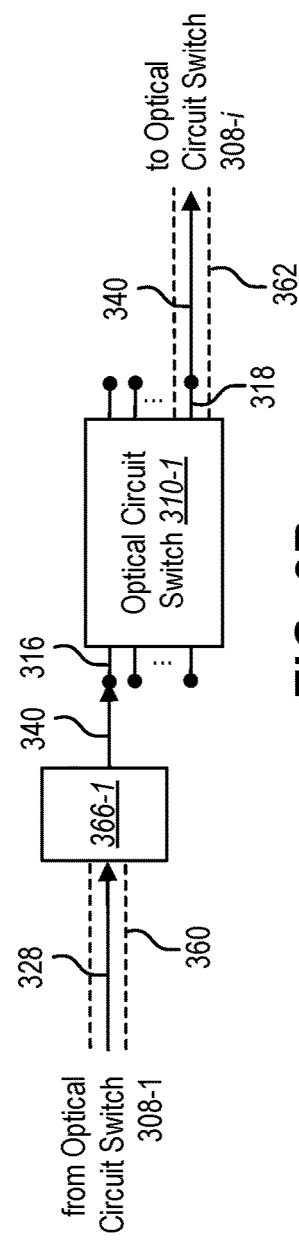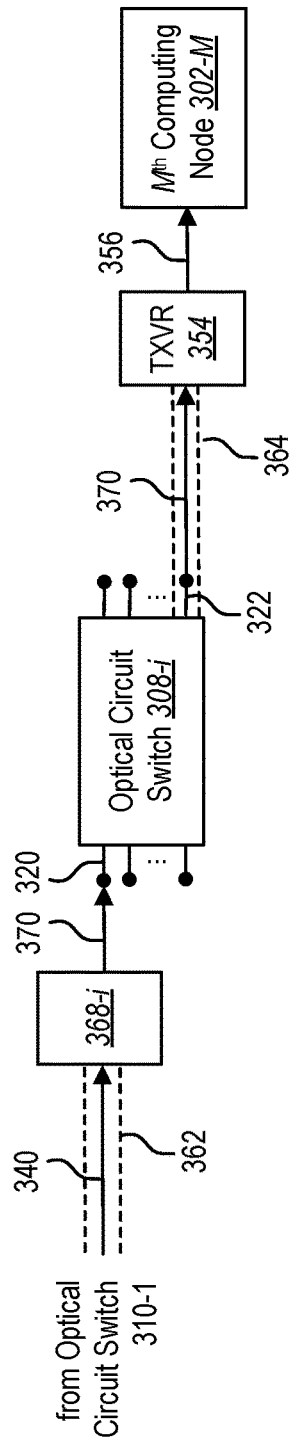
FIG. 3A
FIG. 3B
FIG. 3C

EFFICIENTLY INTERCONNECTING A PLURALITY OF COMPUTING NODES TO FORM A CIRCUIT-SWITCHED NETWORK

CROSS-REFERENCE TO RELATED APPLICATIONS

This application is related to and claims the benefit of U.S. Provisional Patent Application No. 63/109,276 filed on Nov. 3, 2020. The aforementioned application is expressly incorporated herein by reference in its entirety.

BACKGROUND

There are many scenarios in which it can be beneficial to interconnect a plurality of computing nodes in such a way that large amounts of data can be transmitted among the computing nodes with relatively low latency. One example involves disaggregation of computing resources. Currently, most datacenters include many different servers, with each server including one or more central processing units (CPUs) and a certain amount of memory. Disaggregation involves separating servers into their constituent processing and memory resources so that these can be allocated as required according to the needs of each workload. In a datacenter that includes disaggregated computing resources, each rack can include dense pools of processing, memory, and storage blades, all interconnected through an internal network.

Disaggregating servers into resource components provides a number of advantages relative to more conventional approaches. For example, disaggregation can provide additional flexibility compared to the traditional server-centric architecture. Workloads, especially in commercial datacenters, can vary greatly. One of the primary goals of datacenter operation is having enough resources to cover peak demand, yet not under-utilize those same resources during non-peak conditions. Disaggregation increases the chances of being able to supply sufficient resources during time periods of high demand while also ensuring optimal utilization. Some other benefits of disaggregation include lower power consumption and higher density than traditional server-centric architectures, thus enabling each rack to host large numbers of resource nodes (e.g., processing/memory/storage blades).

Disaggregation poses several significant challenges. In a datacenter that includes disaggregated computing resources, each rack typically includes very large numbers of resource nodes (e.g., thousands or even tens of thousands of resource nodes) that need to be interconnected. This is far more than traditional top-of-rack (ToR) switches can support. Also, in order to achieve disaggregation, the interconnections between the computing resources should provide high bandwidth and low latency, similar to the high bandwidth and low latency provided by the communication interfaces inside a traditional server. This can be a significant challenge.

SUMMARY

In accordance with one aspect of the present disclosure, a system for interconnecting a plurality of computing nodes includes a plurality of optical circuit switches and a plurality of electrical circuit switches. The system also includes a first network stage that includes a first plurality of circuit switches selected from among the plurality of optical circuit switches and the plurality of electrical circuit switches. Each computing node among the plurality of computing nodes is optically coupled to at least one of the first plurality of circuit switches. The system also includes a second network stage that includes a second plurality of circuit switches selected from among the plurality of optical circuit switches and the plurality of electrical circuit switches. Each circuit switch among the first plurality of circuit switches is optically coupled to each circuit switch among the second plurality of circuit switches.

In some embodiments, the first plurality of circuit switches includes the plurality of optical circuit switches and the second plurality of circuit switches includes the plurality of electrical circuit switches.

In some embodiments, the first plurality of circuit switches includes the plurality of electrical circuit switches and the second plurality of circuit switches includes the plurality of optical circuit switches.

Each optical circuit switch among the plurality of optical circuit switches can be configured to switch an input optical signal from an input port to an output port based on an optical characteristic of the input optical signal.

In some embodiments, the plurality of computing nodes can comprise a plurality of disaggregated computing nodes. The plurality of disaggregated computing nodes can comprise pools of processing nodes and memory nodes.

In some embodiments, the plurality of computing nodes can be located in a single rack within a datacenter and the plurality of computing nodes can be interconnected to form an intra-rack network.

The system can additionally include a plurality of optical transceivers. Each circuit switch among the first plurality of circuit switches can be coupled to at least one optical transceiver.

In some embodiments, optical communications between the plurality of computing nodes and the first plurality of circuit switches and between the first plurality of circuit switches and the second plurality of circuit switches can occur via free-space optical communications.

In some embodiments, the system can additionally include a first plurality of optical cables that couple the plurality of computing nodes to the first plurality of circuit switches and a second plurality of optical cables that couple the first plurality of circuit switches to the second plurality of circuit switches.

The system can also include a scheduler that configures the first plurality of circuit switches and the second plurality of circuit switches to enable communication paths among the plurality of computing nodes.

In accordance with another aspect of the present disclosure, a system for interconnecting a plurality of computing nodes includes a plurality of node optical transceivers that are electrically coupled to at least some of the plurality of computing nodes and a switch that is optically coupled to the plurality of node optical transceivers. The switch includes a plurality of optical circuit switches and a plurality of electrical circuit switches. The switch also includes a first network stage that includes a first plurality of circuit switches selected from among the plurality of optical circuit switches and the plurality of electrical circuit switches. Each computing node among the plurality of computing nodes is optically coupled to at least one of the first plurality of circuit switches. The switch also includes a second network stage that includes a second plurality of circuit switches selected from among the plurality of optical circuit switches and the plurality of electrical circuit switches. Each circuit switch among the first plurality of circuit switches is optically coupled to each circuit switch among the second plurality of circuit switches.

In some embodiments, the first plurality of circuit switches includes the plurality of optical circuit switches and the second plurality of circuit switches includes the plurality of electrical circuit switches.

In some embodiments, the first plurality of circuit switches includes the plurality of electrical circuit switches and the second plurality of circuit switches includes the plurality of optical circuit switches.

In some embodiments, the plurality of computing nodes can include a plurality of disaggregated computing nodes. The plurality of disaggregated computing nodes can include pools of processing nodes and memory nodes.

The switch can include a plurality of switch optical transceivers. Each circuit switch among the first plurality of circuit switches can be coupled to at least one switch optical transceiver.

In some embodiments, optical communications between the plurality of computing nodes and the first plurality of circuit switches and between the first plurality of circuit switches and the second plurality of circuit switches can occur via free-space optical communications.

In some embodiments, the system can additionally include a first plurality of optical cables that couple the plurality of computing nodes to the first plurality of circuit switches and a second plurality of optical cables that couple the first plurality of circuit switches to the second plurality of circuit switches.

In accordance with another aspect of the present disclosure, a system for interconnecting a plurality of computing nodes to form a circuit-switched network is disclosed. The system includes a first plurality of optical circuit switches that form a first stage of the circuit-switched network. Each computing node among the plurality of computing nodes is optically coupled to an optical circuit switch among the first plurality of optical circuit switches. The system also includes a second plurality of optical circuit switches that form a second stage of the circuit-switched network. Each optical circuit switch among the second plurality of optical circuit switches is optically coupled to each optical circuit switch among the first plurality of optical circuit switches. The system also includes a plurality of wavelength converters that couple the first plurality of optical circuit switches to the second plurality of optical circuit switches. Each wavelength converter is configured to convert an input optical signal to an output optical signal having a desired wavelength.

In some embodiments, each wavelength converter can include a photodetector that is configured to convert the input optical signal to an electrical signal, a light source that is tunable to a plurality of different wavelengths, and an optical modulator that is configured to modulate the electrical signal onto an output signal generated by the light source to produce the output optical signal.

In some embodiments, at least some of the plurality of wavelength converters can be configured to perform wavelength conversion without performing an optical-electrical-optical conversion.

The plurality of computing nodes can include a plurality of disaggregated computing nodes located in a rack within a datacenter. The plurality of disaggregated computing nodes can include pools of processing nodes and memory nodes.

Each optical circuit switch among the first plurality of optical circuit switches and the second plurality of optical circuit switches can include a plurality of input ports and a plurality of output ports. In addition, each optical circuit switch among the first plurality of optical circuit switches and the second plurality of optical circuit switches can be configured to switch an incoming optical signal from an input port to an output port based on a wavelength of the incoming optical signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which:

FIGS. 1A-C illustrate a communication path between a source computing node and a destination computing node in the network shown in FIG. 1.

FIGS. 2A-C illustrate a communication path between a source computing node and a destination computing node in the network shown in FIG. 2.

FIGS. 3A-C illustrate a communication path between a source computing node and a destination computing node in the network shown in FIG. 3.

DETAILED DESCRIPTION

Figure 1:
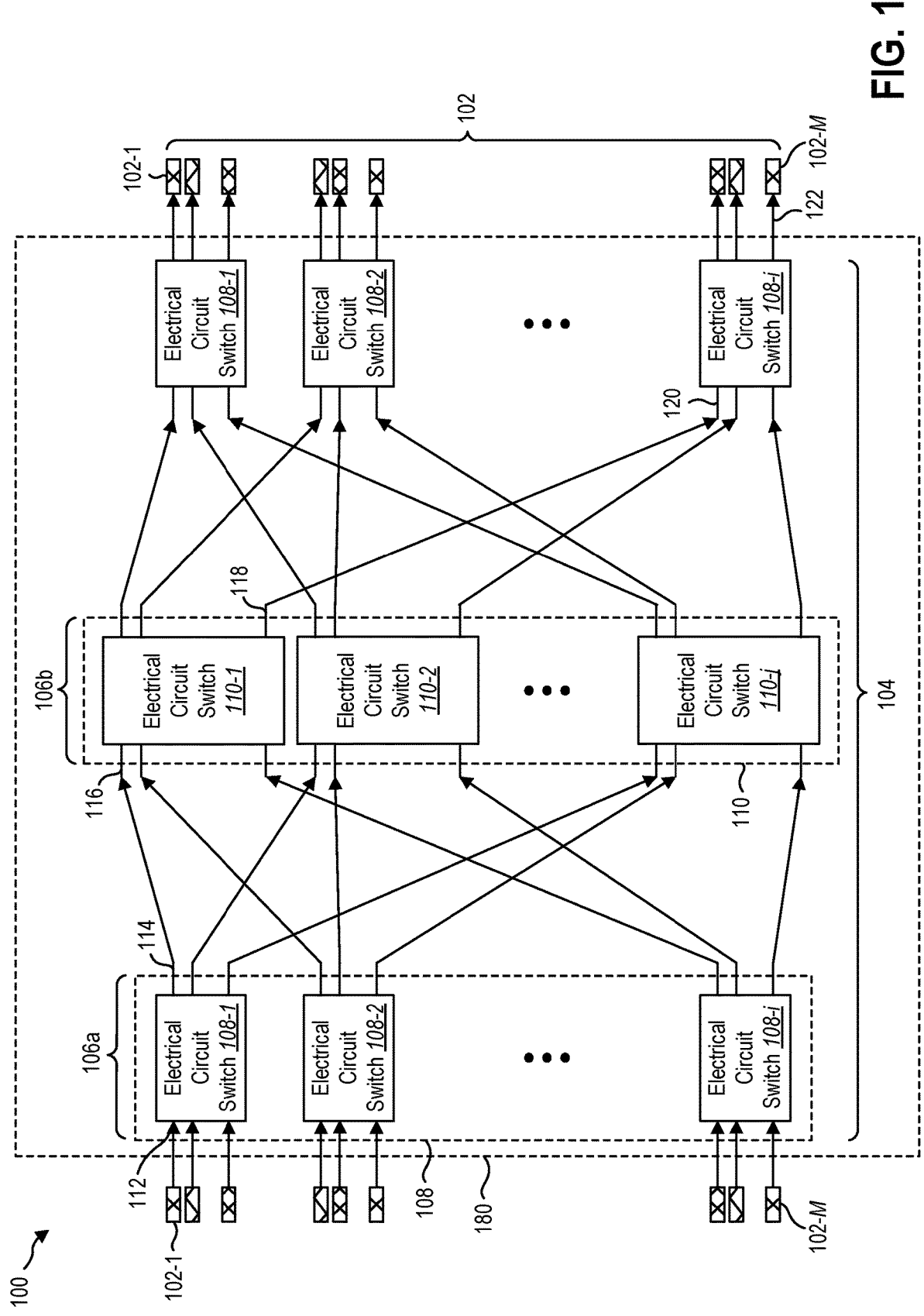
FIG. 1 illustrates an example of a multi-stage network of interconnected computing nodes in accordance with the present disclosure, including a plurality of electrical circuit switches.

The present disclosure is generally related to techniques for efficiently interconnecting a plurality of computing nodes in such a way that large amounts of data can be transmitted among the computing nodes with relatively low latency. The techniques disclosed herein enable a plurality of computing nodes to be interconnected to form a circuit-switched network. A plurality of circuit switches can be used to interconnect the computing nodes. The circuit switches can be optical or electrical (or a combination thereof), as will be discussed in greater detail below. Circuit-switched networks are different from packet-switched networks, which move data in separate, small blocks (packets) based on the destination address in each packet. With packet-switched networks, different packets can travel different routes between a source computing node and a destination computing node. In contrast, circuit-switched networks require a dedicated point-to-point connection to send data between a source computing node and a destination computing node, and all of the data can be sent via the same route (the point-to-point connection).

In some embodiments, the techniques disclosed herein can be utilized to interconnect a plurality of computing nodes that are located in the same rack within a datacenter. In other words, the computing nodes can be interconnected to form an intra-rack network. However, the scope of the present disclosure is not limited to intra-rack networks, and the techniques disclosed herein can be utilized to interconnect a plurality of computing nodes in a variety of different contexts. For example, the techniques disclosed herein could be utilized to connect multiple racks of servers, all of the servers within an entire datacenter, one or more immersion tanks filled with servers, and so forth.

In some embodiments, the computing nodes that are interconnected can be disaggregated computing nodes. For example, a rack can include dense pools of processing, memory, and storage blades, and these can all be interconnected using the techniques disclosed herein.

A hierarchical network topology can be utilized to interconnect a large number of computing nodes (e.g., tens of thousands of computing nodes or more). In some embodiments, the network can include a plurality of network switches that are arranged into a plurality of different stages so as to facilitate communication among all of the computing nodes. As an example, in a two-stage topology, a first stage can include a first plurality of network switches and a second stage can include a second plurality of network switches. Each computing node in the network can be coupled to one of the network switches in the first stage, and each network switch in the first stage can be coupled to each network switch in the second stage. In this way, any computing node in the network can communicate with any other computing node in the network. However, the techniques disclosed herein are not limited to just two network stages. The present disclosure contemplates the use of N network stages, where the value of N can be any integer that is greater than or equal to two.

In some embodiments, a circuit-switched network in accordance with the present disclosure can be implemented with electrical circuit switches only. In other embodiments, a circuit-switched network in accordance with the present disclosure can include a combination of optical circuit switches and electrical circuit switches. In other embodiments, a circuit-switched network in accordance with the present disclosure can be implemented with optical circuit switches only. Examples of each of these kinds of implementations will be described below.

FIG. 1 illustrates an example of a network 100 of interconnected computing nodes 102 in accordance with the present disclosure. In some embodiments, the computing nodes 102 can be located within the same rack in a datacenter. Thus, the network 100 can represent an intra-rack network. As noted above, however, the scope of the present disclosure is not limited to intra-rack networks, and the techniques disclosed herein can be utilized to interconnect a plurality of computing nodes in a variety of different contexts.

There are M computing nodes 102 shown in FIG. 1, where the value of M can be any positive integer. In some embodiments, there can be a very large number of computing nodes 102 in the network 100. In other words, the value of M can be quite large. For example, in some embodiments there can be tens of thousands of computing nodes 102 (or more) in the network 100.

In some embodiments, the computing resources in the network 100 can be disaggregated into their constituent processing and memory resources so that these can be allocated as required according to the needs of each workload. In other words, the network 100 can include dense pools of processing nodes, memory nodes, storage nodes, etc. The various types of nodes that are included in the network 100 may be referred to herein generally as computing nodes 102. In this context, the term "computing node" can refer to a processing node, a memory node, a storage node, and/or another type of node that is utilized by a computing system.

The network 100 includes a plurality of network switches 104 for interconnecting the computing nodes 102. In some embodiments, the network 100 can be implemented as a circuit-switched network, and the network switches 104 can take the form of circuit switches.

In this context, the term "network switch" can refer generally to any device in a computer network that connects other devices together. The term "circuit switch" can refer to a network switch that is used in a circuit-switched network. A circuit switch can selectively connect an input signal from an input port to one of a plurality of available output ports. Circuit switches can be electrical or optical, as will be explained in greater detail below. One potential benefit of circuit switches relative to packet switches is that circuit switches can operate at the physical layer of a network with no buffers, no arbitration, and no inspection mechanisms. This means that a circuit switch can be less expensive and more power efficient than an equivalent packet switch.

The network 100 can be configured with a hierarchical topology. For example, the network switches 104 can be arranged into a plurality of different stages. In the depicted embodiment, the network 100 includes two stages: a first stage 106a and a second stage 106b. However, the fact that the depicted network 100 includes only two stages 106a-b should not be interpreted as limiting the scope of the present disclosure. As noted above, a network configured in accordance with the present disclosure can include N network stages, where the value of N can be any integer that is greater than or equal to two.

In the depicted embodiment, the network switches 104 in both the first stage 106a and the second stage 106b of the network 100 are implemented as electrical circuit switches 108, 110. In particular, the first stage 106a of the network 100 includes i electrical circuit switches 108, where the value of i can be any positive integer. A first electrical circuit switch 108-1, a second electrical circuit switch 108-2, and an $i^{th}$ electrical circuit switch 108-$i$ are shown in FIG. 1. The second stage 106b of the network 100 includes j electrical circuit switches 110, where the value of j can also be any positive integer. A first electrical circuit switch 110-1, a second electrical circuit switch 110-2, and a $j^{th}$ electrical circuit switch 110-$j$ are shown in FIG. 1.

In some embodiments, the electrical circuit switches 108, 110 can be implemented as electrical crossbar switches. Electrical crossbar switches can be designed to implement all permutations of connections a inputs and outputs. In other words, each input can be connected to any of the outputs. An electrical crossbar switch can include a collection of switches arranged in a matrix configuration. In other words, an electrical crossbar switch can have multiple input and output lines that form a crossed pattern of interconnecting lines between which a connection can be established by closing a switch located at each intersection.

Each of the computing nodes 102 is optically coupled to one of the electrical circuit switches 108 in the first stage 106a of the network 100. In addition, each electrical circuit switch 108 in the first stage 108a of the network 100 is optically coupled to each electrical circuit switch 110 in the second stage 106b of the network 100. The arrows between the various components in FIG. 1 can be interpreted as representing optical communication channels between these components. In some embodiments, communication between the computing nodes 102, the electrical circuit switches 108 in the first stage 106a of the network 100, and the electrical circuit switches 110 in the second stage 106b of the network 100 can occur via free-space optical communications. Alternatively, in other embodiments, communication between the computing nodes 102, the electrical circuit switches 108 in the first stage 106a of the network 100, and the electrical circuit switches 110 in the second stage 106b of the network 100 can occur via optical cables. For example, the computing nodes 102 can be optically coupled to the electrical circuit switches 108 in the first stage 106a of the network 100 via a first set of optical cables, and the electrical circuit switches 108 in the first stage 106a of the network 100 can be optically coupled to the electrical circuit switches 110 in the second stage 106b of the network 100 via a second set of optical cables. The arrows between the computing nodes 102 and the electrical circuit switches 108 can represent the first set of optical cables, and the arrows between the electrical circuit switches 108 and the electrical circuit switches 110 can represent the second set of optical cables.

The hierarchical topology of the network 100 enables any computing node 102 in the network 100 to communicate with any other computing node 102 in the network 100. A specific example will now be described.

Suppose that the first computing node 102-1 needs to communicate with (e.g., send data to) the $M^{th}$ computing node 102-M in the network 100. The first computing node 102-1 is optically coupled to the first electrical circuit switch 108-1. The $M^{th}$ computing node 102-M is optically coupled to the $i^{th}$ electrical circuit switch 108-$i$. To enable the first computing node 102-1 to send data to the $M^{th}$ computing node 102-M, a communication path can be established between the first computing node 102-1 and the $M^{th}$ computing node 102-M. The communication path can include the electrical circuit switch 108-1 (which is optically coupled to the first computing node 102-1), one of the electrical circuit switches 110 in the second stage 106b of the network 100, and the electrical circuit switch 108-$i$ (which is optically coupled to the $M^{th}$ computing node 102-M). The electrical circuit switch 110 in the second stage 106b of the network 100 that will be used for the communication path can be selected by a scheduling mechanism, as will be discussed in greater detail below. For purposes of the present example, it will be assumed that the electrical circuit switch 110-1 in the second stage 106b of the network 100 will be used for the communication path.

To send data to the $M^{th}$ computing node 102-M, the first computing node 102-1 can send an optical signal that includes the data to the first electrical circuit switch 108-1. When the optical signal arrives at the first electrical circuit switch 108-1, the optical signal can be converted into an electrical signal and delivered to an input port 112 of the electrical circuit switch 108-1. The electrical circuit switch 108-1 can switch the electrical signal from the input port 112 to an output port 114 that is coupled to the electrical circuit switch 110-1 in the second stage 106b of the network 100. The electrical signal can then be converted into an optical signal and transmitted to the first electrical circuit switch 110-1. When the optical signal arrives at the electrical circuit switch 110-1, the optical signal can be converted into an electrical signal and delivered to an input port 116 of the electrical circuit switch 110-1. The electrical circuit switch 110-1 can then switch the electrical signal from the input port 116 to an output port 118 that is coupled to the electrical circuit switch 108-$i$ in the first stage 106a of the network 100. The electrical signal can then be converted into an optical signal and transmitted to the electrical circuit switch 108-$i$. When the optical signal arrives at the $i^{th}$ electrical circuit switch 108-$i$, the optical signal can be converted into an electrical signal and delivered to an input port 120 of the $i^{th}$ electrical circuit switch 108-$i$. The $i^{th}$ electrical circuit switch 108-$i$ can switch the electrical signal from the input port 120 to an output port 122 that is coupled to the $M^{th}$ computing node 102-M. The electrical signal is then converted into an optical signal and transmitted to the $M^{th}$ computing node 102-M. At the $M^{th}$ computing node 102-M, the optical signal is converted back into an electrical signal.

In the example just described, any of the electrical circuit switches 110 in the second stage 106b of the network 100 could have been used to establish the communication path between the first computing node 102-1 and the $M^{th}$ computing node 102-M. This is because, as noted above, each electrical circuit switch 108 in the first stage 108a of the network 100 is optically coupled to each electrical circuit switch 110 in the second stage 106b of the network 100. The network 100 can include some type of scheduling mechanism that assigns a particular electrical circuit switch 110 in the second stage 106b of the network 100 when two computing nodes 102 need to communicate.

In some embodiments, the scheduling mechanism can include a static scheduler that reconfigures the electrical circuit switches 108, 110 in the network 100 so that each pair of computing nodes 102 is connected in accordance with a pre-determined schedule. In some embodiments, the static scheduler could be configured so that each pair of computing nodes 102 is connected at an equal rate. If this kind of scheduler were utilized in connection with the example just described, the first computing node 102-1 and the $M^{th}$ computing node 102-M (as well as every other pair of computing nodes 102 in the network 100) could be periodically connected to one another. When the first computing node 102-1 has data to send to the $M^{th}$ computing node 102-M, the first computing node 102-1 could wait until a time slot when, according to the schedule, a communication path will be set up between the first computing node 102-1 and the $M^{th}$ computing node 102-M. When such a time slot occurs, the first computing node 102-1 can then transmit the data to the $M^{th}$ computing node 102-M.

To accommodate dynamic traffic patterns atop a static schedule, traffic from each computing node 102 can be uniformly distributed across all of the computing nodes 102 in a particular rack (or other group of computing nodes 102), which then forward the traffic to the destination. This can be thought of as a form of detour routing. Such coordination-free scheduling obviates the complexity and latency associated with centralized schedulers while guaranteeing the worst-case network throughput across any traffic pattern. For this kind of scheduling, all computing nodes 102 in the network 100 should be connected through what looks like a single non-blocking switch. In the depicted embodiment, this can be achieved through the use of a plurality of relatively low port-count circuit switches (i.e., the electrical circuit switches 108, 110) connected in a Clos topology. When reconfigured synchronously, the switches can operate like a single circuit switch.

Of course, many different kind of scheduling mechanisms can be utilized in accordance with the present disclosure, and the scope of the present disclosure should not be limited to any specific kind of scheduling mechanism. In some embodiments, the scheduling mechanism can include a centralized scheduler that reconfigures the electrical circuit switches 108, 110 on as needed basis whenever communication between two computing nodes 102 needs to occur. The centralized scheduler may be configured to operate at a sub-microsecond granularity. Alternatively, in some embodiments the scheduling mechanism can include a decentralized scheduler. For example, instead of computing nodes 102 sending requests to a single, centralized entity, the network 100 could include a hierarchy of scheduling entities. In some embodiments, different computing nodes 102 or groups of computing nodes 102 could send requests to different scheduling entities. These scheduling entities could communicate with each other in order to reconfigure the electrical circuit switches 108, 110. As another example, in some embodiments the network 100 can include a plurality of scheduling entities implemented on the electrical circuit switches 108, 110 themselves. Alternatively still, in some embodiments the network 100 can be configured to operate without a scheduling mechanism. For example, instead of a scheduling mechanism, a congestion control loop could instead be utilized in order to minimize collisions.

The example described above involved communication between the first computing node 102-1 and the $M^{th}$ computing node 102-M. However, communication between any two computing nodes 102 in the network 100 can occur in a similar manner. A communication path can be established between a source computing node 102 and a destination computing node 102. The communication path can include (1) the electrical circuit switch 108 in the first stage 106a of the network 100 that is coupled to the source computing node 102, (2) one of the electrical circuit switches 110 in the second stage 106b of the network 100, and (3) the electrical circuit switch 108 in the first stage 106a of the network 100 that is coupled to the destination computing node 102.

In some embodiments, the electrical circuit switches 108 in the first stage 106a of the network 100 and the electrical circuit switches 110 in the second stage 106b of the network 100 can function collectively so that they appear as a single switch 180 from the perspective of the computing nodes 102 in the network 100. Therefore, even though the depicted network 100 includes a plurality of different electrical circuit switches 108, 110, all of these electrical circuit switches 108, 110 can operate together so that interactions between the computing nodes 102 and the electrical circuit switches 108, 110 can occur as if the electrical circuit switches 108, 110 were a single switch 180.

The computing nodes 102 and the electrical circuit switches 108 in the first stage 108a of the network 100 are shown on both the left side and the right side of FIG. 1. In other words, the computing nodes 102 on the right side of FIG. 1 are identical to the computing nodes 102 on the left side of FIG. 1, and the electrical circuit switches 108 on the right side of FIG. 1 are identical to the electrical circuit switches 108 on the left side of FIG. 1. This is because FIG. 1 is an unfolded diagram of the network 100. In an unfolded diagram, the data path from a source computing node 102 (e.g., the first computing node 102-1 in the example described above) to a destination computing node (e.g., the $M^{th}$ computing node 102-M in the example described above) is shown from left to right.

The network 100 shown in FIG. 1 provides significant benefits compared to current architectures for intra-rack networks. For example, the network 100 shown in FIG. 1 is capable of interconnecting the computing nodes 102 in a way that provides high bandwidth and low latency sufficient for meeting the requirements of disaggregated workloads. It might be theoretically possible for a packet-switched network design to interconnect a large number of computing nodes 102 in a way that provides the desired high bandwidth and low latency. However, such a packet-switched network design would be significantly less power and cost efficient than current intra-rack networks. Power is a particular concern because datacenters are typically designed so that a rack's total power has a hard limit due to constraints on power supply density, rack cooling, and heat dissipation.

In the example described above, the first computing node 102-1 sends data to the $M^{th}$ computing node 102-M in the network 100. FIGS. 1A-C illustrate the communication path between the first computing node 102-1 and the $M^{th}$ computing node 102-M in greater detail. In particular, FIGS. 1A-C illustrate various components in the network 100 that facilitate communication between the first computing node 102-1 and the $M^{th}$ computing node 102-M.

Reference is initially made to FIG. 1A. To send data to the $M^{th}$ computing node 102-M, the first computing node 102-1 can provide an electrical signal 124 (which includes the data to be sent) to a transceiver 126. The transceiver 126 can convert the electrical signal 124 into an optical signal 128, and send the optical signal 128 to the electrical circuit switch 108-1 via an optical communication channel 158. When the optical signal 128 arrives at the electrical circuit switch 108-1, a transceiver 130 can convert the optical signal 128 to an electrical signal 132. The electrical signal 132 can then be delivered to an input port 112 of the electrical circuit switch 108-1. The electrical circuit switch 108-1 can switch the electrical signal from the input port 112 to an output port 114 that is optically coupled to the electrical circuit switch 110-1 in the second stage 106b of the network 100. A transceiver 134 can convert the electrical signal 132 into an optical signal 136 and send the optical signal 136 to the electrical circuit switch 110-1.

Reference is now made to FIG. 1B. The transceiver 134 can send the optical signal 136 to the electrical circuit switch 110-1 via an optical communication channel 160. When the optical signal 136 arrives at the electrical circuit switch 110-1, a transceiver 138 can convert the optical signal 136 to an electrical signal 140. The electrical signal 140 can then be delivered to an input port 116 of the electrical circuit switch 110-1. The electrical circuit switch 110-1 can switch the electrical signal 140 from the input port 116 to an output port 118 that is optically coupled to the electrical circuit switch 108-$i$ in the first stage 106a of the network 100. A transceiver 142 can convert the electrical signal 140 into an optical signal 144 and send the optical signal 144 to the electrical circuit switch 108-$i$.

Reference is now made to FIG. 1C. The transceiver 142 can send the optical signal 144 to the electrical circuit switch 108-$i$ via an optical communication channel 162. When the optical signal 144 arrives at the electrical circuit switch 108-$i$, a transceiver 146 can convert the optical signal 144 to an electrical signal 148. The electrical signal 148 can then be delivered to an input port 120 of the electrical circuit switch 108-$i$. The electrical circuit switch 108-$i$ can switch the electrical signal 148 from the input port 120 to an output port 122 that is optically coupled to the $M^{th}$ computing node 102-M. A transceiver 150 can convert the electrical signal 148 into an optical signal 152 and send the optical signal 152 to the $M^{th}$ computing node 102-M via an optical communication channel 164. When the optical signal 152 arrives at the $M^{th}$ computing node 102-M, a transceiver 154 can convert the optical signal 152 into an electrical signal 156, and this electrical signal 156 can be delivered to the $M^{th}$ computing node 102-M.

Figure 2:
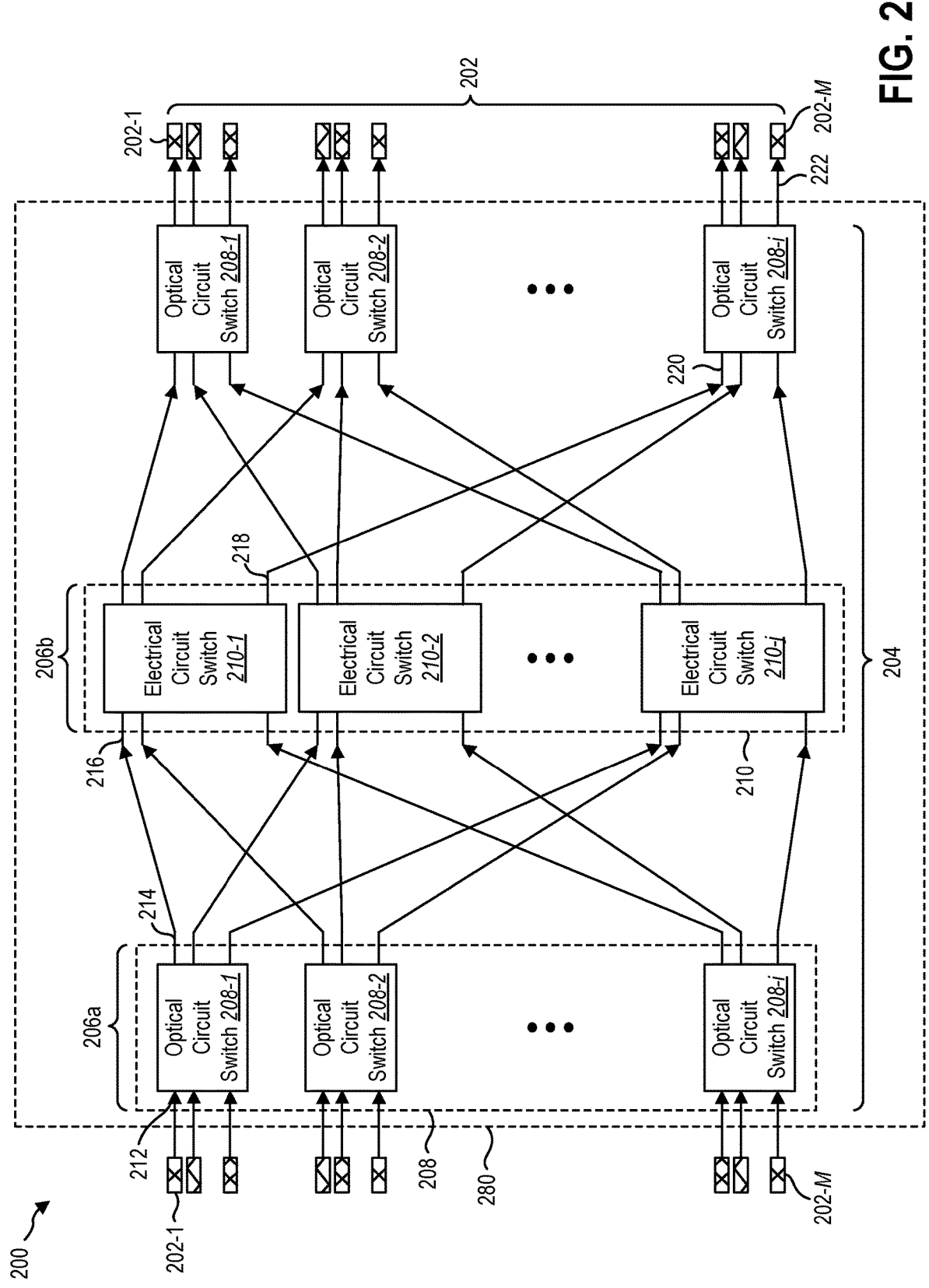
FIG. 2 illustrates another example of a multi-stage network of interconnected computing nodes in accordance with the present disclosure, including a combination of optical circuit switches and electrical circuit switches.

FIG. 2 illustrates another example of a network 200 of interconnected computing nodes 202 in accordance with the present disclosure. The network 200 shown in FIG. 2 is similar to the network 100 that was described above in connection with FIG. 1, except as indicated below.

Like the network 100 shown in FIG. 1, the network 200 shown in FIG. 2 includes a plurality of network switches 204 for interconnecting the computing nodes 202, and the network switches 204 can take the form of circuit switches. In the network 100 shown in FIG. 1, the network switches 104 take the form of electrical circuit switches 108, 110. In contrast, the network 200 shown in FIG. 2 includes a combination of optical circuit switches 208 and electrical circuit switches 210.

In the depicted network 200, the network switches 204 in the first stage 206$a$ of the network 200 are implemented as optical circuit switches 208, and the network switches 204 in the second stage 206$b$ of the network 200 are implemented as electrical circuit switches 210. In particular, the first stage 206$a$ of the network 200 includes i optical circuit switches 208, where the value of i can be any positive integer. A first optical circuit switch 208-1, a second optical circuit switch 208-2, and an $i^{th}$ optical circuit switch 208-$i$ are shown in FIG. 2. The second stage 206$b$ of the network 200 includes j electrical circuit switches 210, where the value of j can also be any positive integer. A first electrical circuit switch 210-1, a second electrical circuit switch 210-2, and a $j^{th}$ electrical circuit switch 210-$j$ are shown in FIG. 2. The use of optical circuit switches 208 instead of electrical switches 108 in the first stage 206$a$ of the network 200 can provide certain benefits, as will be described in greater detail below.

Each of the computing nodes 202 is optically coupled to one of the optical circuit switches 208 in the first stage 206$a$ of the network 200. In addition, each electrical circuit switch 210 in the second stage 206$b$ of the network 200 is optically coupled to each optical circuit switch 208 in the first stage 206$a$ of the network 200. As in FIG. 1, the arrows between the various components in FIG. 2 can be interpreted as representing optical communication channels between these components. The optical communication channels can be implemented via free-space optical communications and/or via optical cables.

Like the network 100 shown in FIG. 1, the hierarchical topology of the network 200 enables any computing node 202 in the network 200 to communicate with any other computing node 202 in the network 200. For example, to enable the first computing node 202-1 to send data to the $M^{th}$ computing node 202-M, a communication path can be established between the first computing node 202-1 and the $M^{th}$ computing node 202-M. The communication path can include the optical circuit switch 208-1 (which is optically coupled to the first computing node 202-1) in the first stage 206$a$ of the network 200, one of the electrical circuit switches 210 in the second stage 206$b$ of the network 200 (which can be assigned by a scheduling mechanism), and the optical circuit switch 208-$i$ (which is optically coupled to the $M^{th}$ computing node 202-M) in the first stage 206$a$ of the network 200. Although the example just described applies to communication between the first computing node 202-1 and the $M^{th}$ computing node 202-M, communication between any two computing nodes 202 in the network 200 can occur in a similar manner.

The optical circuit switches 208 can be configured to switch an input optical signal from an input port to an output port. In some embodiments, the optical circuit switches 208 can utilize microelectromechanical systems (MEMS) mirrors. For example, the optical circuit switches 208 can include MEMS optical gratings. As another example, the optical circuit switches 208 can include photonics devices.

In some embodiments, the optical circuit switches 208 can be configured to switch an input optical signal from an input port to an output port based on an optical characteristic of the input signal. The optical characteristic can be, for example, the wavelength of the input signal, the phase of the input signal, the polarization of the input signal, the angle of incidence of the input signal, or any other optical characteristic that can be used to switch an input optical signal from an input port to an output port.

The use of optical circuit switches 208 instead of electrical switches 108 in the first stage 206$a$ of the network 200 reduces the number of optical-electrical and electrical-optical signal conversions that have to be performed. This can improve the overall performance of the network 200 by reducing latency.

To see how the use of optical circuit switches 208 can improve network performance, consider an example in which the first computing node 202-1 sends data to the $M^{th}$ computing node 202-M. To facilitate comparisons with the network 100 shown in FIG. 1, the example will be similar to the example described previously in connection with FIG. 1, which involved the first computing node 102-1 sending data to the $M^{th}$ computing node 102-M.

To send data to the $M^{th}$ computing node 202-M, the first computing node 202-1 can send an optical signal that includes the data to the optical circuit switch 208-1. The optical signal can be delivered to an input port 212 of the optical circuit switch 208-1. The optical signal can have a characteristic (e.g., wavelength) that causes the optical circuit switch 208-1 to switch the optical signal to the appropriate output port. For purposes of the present example, it will be assumed that the electrical circuit switch 210-1 in the second stage 206$b$ of the network 200 will be used for the communication path between the first computing node 202-1 and the $M^{th}$ computing node 202-M. Accordingly, the optical signal sent by the first computing node 202-1 can have a characteristic (e.g., wavelength) that causes the optical circuit switch 208-1 to switch the optical signal to an output port 214 that is coupled to the electrical circuit switch 210-1 in the second stage 206$b$ of the network 200. Therefore, the optical signal carrying the data can pass through the first stage 206$a$ of the network 200 without requiring an optical-electrical or electrical-optical signal conversion.

In contrast, in the example described above in connection with FIG. 1, two signal conversions are performed in the first stage 106$a$ of the network 100. In particular, when the optical signal sent by the first computing node 102-1 arrives at the electrical circuit switch 108-1, the optical signal is converted into an electrical signal before being delivered to the input port 112 of the electrical circuit switch 108-1. Then, after the electrical circuit switch 108-1 has switched the electrical signal from the input port 112 to the output port 114, the electrical signal is converted into an optical signal before being transmitted to the second stage 106b of the network 100. Accordingly, the configuration of the network 200 shown in FIG. 2 saves two signal conversions in the first stage 206a of the network 200 compared to the configuration of the network 100 shown in FIG. 1.

Continuing with the example involving the network 200 shown in FIG. 2, the operation of the electrical circuit switches 210 in the second stage 206b of the network 200 can be similar to the operation of the electrical circuit switches 110 in the second stage 106b of the network 100 shown in FIG. 1. Thus, when the optical signal arrives at the electrical circuit switch 210-1, the optical signal can be converted into an electrical signal and delivered to an input port 216 of the electrical circuit switch 210-1. The electrical circuit switch 210-1 can then switch the electrical signal from the input port 216 to an output port 218 that is optically coupled to the optical circuit switch 208-$i$ in the first stage 206a of the network 200 (which is optically coupled to the $M^{th}$ computing node 202-M). The electrical signal can then be converted into an optical signal and transmitted to the optical circuit switch 208-$i$.

The optical signal transmitted by the electrical circuit switch 210-1 (or, more specifically, by a transceiver at the output port 218 of the electrical circuit switch 210-1) can be delivered to an input port 220 of the optical circuit switch 208-$i$, and the optical signal can have a characteristic (e.g., wavelength) that causes the optical circuit switch 208-$i$ to switch the optical signal to the output port 222 that is optically coupled to the $M^{th}$ computing node 202-M. Therefore, the optical signal leaving the second stage 206b of the network 200 can pass back through the first stage 206a of the network 200 without requiring an optical-electrical or electrical-optical signal conversion.

In contrast, in the example described above in connection with FIG. 1, two additional signal conversions are performed after the optical signal leaves the second stage 106b of the network 100 and passes back through the first stage 106a of the network 100. In particular, when the optical signal arrives at the electrical circuit switch 108-$i$, the optical signal is converted into an electrical signal and delivered to an input port 120 of the electrical circuit switch 108-$i$. The electrical circuit switch 108-$i$ then switches the electrical signal from the input port 120 to an output port 122 that is optically coupled to the $M^{th}$ computing node 102-M. The electrical signal is then converted into an optical signal and transmitted to the $M^{th}$ computing node 102-M. Accordingly, the configuration of the network 200 shown in FIG. 2 saves two additional signal conversions after the optical signal leaves the second stage 206b of the network 200 and passes back through the first stage 206a of the network 200.

In some embodiments, the optical circuit switches 208 in the first stage 206a of the network 200 and the electrical circuit switches 210 in the second stage 206b of the network 200 can function collectively so that they appear as a single switch 280 from the perspective of the computing nodes 202 in the network 200. Therefore, even though the depicted network 200 includes a plurality of different optical circuit switches 208 and a plurality of different electrical circuit switches 210, all of these optical circuit switches 208 and electrical circuit switches 210 can operate together so that interactions between the computing nodes 202 and the circuit switches (i.e., the optical circuit switches 208 and the electrical circuit switches 210) can occur as if the circuit switches were a single network switch 280.

FIGS. 2A-C illustrate the communication path between the first computing node 202-1 and the $M^{th}$ computing node 202-M in greater detail. In particular, FIGS. 2A-C illustrate various components in the network 200 that facilitate communication between the first computing node 202-1 and the $M^{th}$ computing node 202-M.

Reference is initially made to FIG. 2A. To send data to the $M^{th}$ computing node 202-M, the first computing node 202-1 can provide an electrical signal 224 (which includes the data to be sent) to a transceiver 226. The transceiver 226 can convert the electrical signal 224 into an optical signal 228, and send the optical signal 228 to the optical circuit switch 208-1 via an optical communication channel 258. The optical signal 228 can be delivered to an input port 212 of the optical circuit switch 208-1, and the optical signal 228 can have a characteristic (e.g., wavelength) that causes the optical circuit switch 208-1 to switch the optical signal 228 to the appropriate output port. In this example, the optical circuit switch 208-1 can switch the optical signal 228 from the input port 212 to an output port 214 that is optically coupled to the electrical circuit switch 210-1 in the second stage 206b of the network 200 via an optical communication channel 260. Therefore, as discussed above, the optical signal 228 can pass through the first stage 206a of the network 200 without requiring an optical-electrical or electrical-optical signal conversion.

Reference is now made to FIG. 2B. From the output port 214 of the optical circuit switch 208-1, the optical signal 228 can be sent to the electrical circuit switch 210-1 via the optical communication channel 260. When the optical signal 228 arrives at the electrical circuit switch 210-1, a transceiver 238 can convert the optical signal 228 to an electrical signal 240. The electrical signal 240 can then be delivered to an input port 216 of the electrical circuit switch 210-1. The electrical circuit switch 210-1 can switch the electrical signal 240 from the input port 216 to an output port 218 that is optically coupled to the electrical circuit switch 208-$i$ in the first stage 206a of the network 200 (which is optically coupled to the $M^{th}$ computing node 202-M). A transceiver 242 can convert the electrical signal 240 into an optical signal 244 and send the optical signal 244 to the electrical circuit switch 208-$i$.

Reference is now made to FIG. 2C. The transceiver 242 can send the optical signal 244 to the optical circuit switch 208-$i$ via an optical communication channel 262. The optical signal 244 can be delivered to an input port 220 of the optical circuit switch 208-$i$, and the optical signal 244 can have a characteristic (e.g., wavelength) that causes the optical circuit switch 208-$i$ to switch the optical signal 244 to the appropriate output port. In this example, the optical circuit switch 208-$i$ can switch the optical signal 244 from the input port 220 to an output port 222 that is optically coupled to the $M^{th}$ computing node 202-M via an optical communication channel 264. Therefore, as discussed above, the optical signal 244 can leave the second stage 206b of the network 200 and can pass back through the first stage 206a of the network 200 without requiring an optical-electrical or electrical-optical signal conversion until the optical signal 244 reaches the $M^{th}$ computing node 202-M. When the optical signal 244 arrives at the $M^{th}$ computing node 202-M, a transceiver 254 can convert the optical signal 244 into an electrical signal 256, and this electrical signal 256 can be delivered to the $M^{th}$ computing node 202-M.

As indicated above, replacing the electrical circuit switches 108 in the network 100 shown in FIG. 1 with the optical circuit switches 208 in the network 200 shown in FIG. 2 can improve the performance of the network 200 by reducing latency. This can be seen by comparing the number of optical-electrical and electrical-optical signal conversions that are required in the examples shown in FIGS. 1A-C and FIGS. 2A-C.

In the example shown in FIGS. 1A-C, a total of eight signal conversions are performed. This includes (1) the conversion from the electrical signal 124 to the optical signal 128 performed by the transceiver 126, (2) the conversion from the optical signal 128 to the electrical signal 132 performed by the transceiver 130, (3) the conversion from the electrical signal 132 to the optical signal 136 performed by the transceiver 134, (4) the conversion from the optical signal 136 to the electrical signal 140 performed by the transceiver 138, (5) the conversion from the electrical signal 140 to the optical signal 144 performed by the transceiver 142, (6) the conversion from the optical signal 144 to the electrical signal 148 performed by the transceiver 146, (7) the conversion from the electrical signal 148 to the optical signal 152 performed by the transceiver 150, and (8) the conversion from the optical signal 152 to the electrical signal 156 performed by the transceiver 154.

By contrast, in the example shown in FIGS. 2A-C, a total of only four signal conversions are performed. This includes (1) the conversion from the electrical signal 224 to the optical signal 228 performed by the transceiver 226, (2) the conversion from the optical signal 228 to the electrical signal 240 performed by the transceiver 238, (3) the conversion from the electrical signal 240 to the optical signal 244 performed by the transceiver 242, and (4) the conversion from the optical signal 244 to the electrical signal 256 performed by the transceiver 254.

As can be seen, replacing the electrical circuit switches 108 in the network 100 shown in FIG. 1 with the optical circuit switches 208 in the network 200 shown in FIG. 2 reduces the number of signal conversions that have to be performed when two computing nodes 202 communicate with one another. Therefore, the use of optical circuit switches 208 instead of electrical circuit switches 108 in the first stage 206a of the network 200 can improve the performance of the network 200 by reducing latency.

Figure 3:
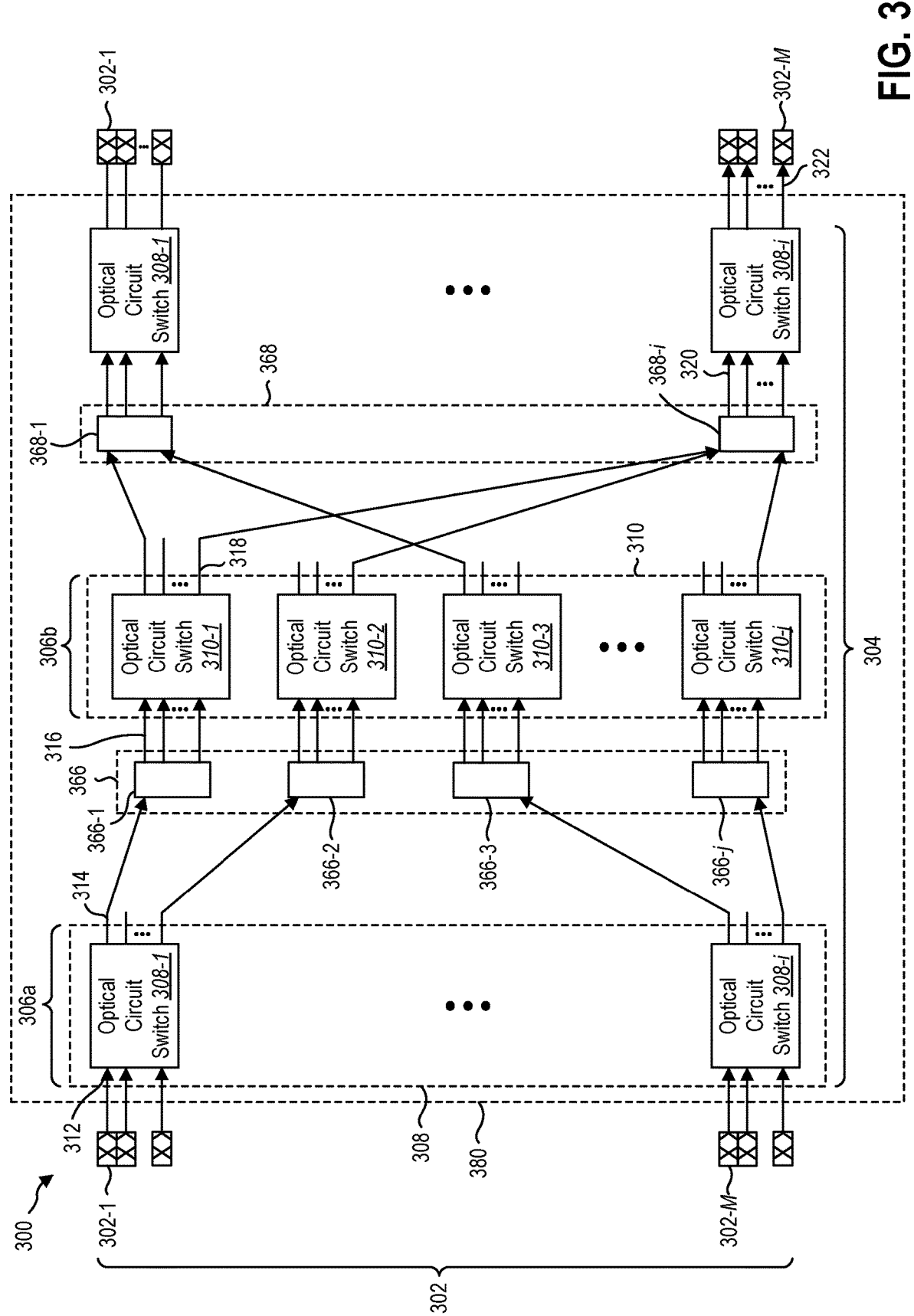
FIG. 3 illustrates another example of a multi-stage network of interconnected computing nodes in accordance with the present disclosure, including a plurality of optical circuit switches.

FIG. 3 illustrates another example of a network 300 of interconnected computing nodes 302 in accordance with the present disclosure. The network 300 shown in FIG. 3 is similar to the network 200 that was described above in connection with FIG. 2, except as indicated below.

Like the network 200 shown in FIG. 2, the network 300 shown in FIG. 3 includes a plurality of network switches 304 for interconnecting the computing nodes 302, and the network switches 304 can take the form of circuit switches. The network 200 shown in FIG. 2 includes a combination of optical circuit switches 208 and electrical circuit switches 210. In contrast, in the network 300 shown in FIG. 3, the network switches 304 take the form of optical circuit switches 308, 310. In particular, the first stage 306a of the network 300 includes i optical circuit switches 308, where the value of i can be any positive integer. A first optical circuit switch 308-1 and an $i^{th}$ optical circuit switch 308-$i$ are shown in FIG. 3. The second stage 306b of the network 300 includes j optical circuit switches 310, where the value of j can also be any positive integer. A first optical circuit switch 310-1, a second optical circuit switch 310-2, a third optical circuit switch 310-3, and a $j^{th}$ optical circuit switch 310-$j$ are shown in FIG. 3.

Each of the computing nodes 302 is optically coupled to one of the optical circuit switches 308 in the first stage 306a of the network 300. In addition, each optical circuit switch 310 in the second stage 306b of the network 300 is optically coupled to each optical circuit switch 308 in the first stage 306a of the network 300. As before, the arrows between the various components in FIG. 3 can be interpreted as representing optical communication channels between these components. The optical communication channels can be implemented via free-space optical communications and/or via optical cables.

As before, the hierarchical topology of the network 300 enables any computing node 302 in the network 300 to communicate with any other computing node 302 in the network 300. For example, to enable the first computing node 302-1 to send data to the $M^{th}$ computing node 302-M, a communication path can be established between the first computing node 302-1 and the $M^{th}$ computing node 302-M. The communication path can include the optical circuit switch 308-1 (which is optically coupled to the first computing node 302-1) in the first stage 306a of the network 300, one of the optical circuit switches 310 in the second stage 306b of the network 300 (which can be assigned by a scheduling mechanism), and the optical circuit switch 308-$i$ (which is optically coupled to the $M^{th}$ computing node 302-M) in the second stage 306b of the network 300. Although the example just described applies to communication between the first computing node 302-1 and the $M^{th}$ computing node 302-M, communication between any two computing nodes 302 in the network 300 can occur in a similar manner.

As before, the optical circuit switches 308, 310 can be configured to switch an input optical signal from an input port to an output port based on an optical characteristic (e.g., wavelength) of the input signal. However, in a multi-stage network like the network 300 shown in FIG. 3, it is not feasible to have the same optical signal travel through the first stage 306a and the second stage 306b of the network 300.

For example, consider an example (similar to the examples described previously) in which the first computing node 302-1 sends data to the $M^{th}$ computing node 302-M. To send data to the $M^{th}$ computing node 302-M, the first computing node 302-1 can send an optical signal that includes the data to the optical circuit switch 308-1. The optical signal can be delivered to an input port 312 of the optical circuit switch 308-1. The optical signal can have a characteristic (e.g., wavelength) that causes the optical circuit switch 308-1 to switch the optical signal to the appropriate output port. For purposes of the present example, it will be assumed that the optical circuit switch 310-1 in the second stage 306b of the network 300 will be used for the communication path between the first computing node 302-1 and the $M^{th}$ computing node 302-M. Accordingly, the optical signal sent by the first computing node 302-1 can have a characteristic (e.g., wavelength) that causes the optical circuit switch 308-1 to switch the optical signal to an output port 314 that is coupled to the optical circuit switch 310-1 in the second stage 306b of the network 300.

However, when the optical signal arrives at the optical circuit switch 310-1 in the second stage 306b of the network 300, the characteristic of the optical signal may not be the correct optical characteristic for causing the optical circuit switch 310-1 to switch the optical signal to the desired output port. In the present example, it is desirable for the optical circuit switch 310-1 to switch the incoming optical signal from the input port 316 to an output port 318 that is optically coupled to the optical circuit switch 308-*i* in the first stage 306*a* of the network 300 (which is optically coupled to the M$^{th}$ computing node 302-M). However, the optical characteristic of the incoming input signal may cause the optical signal to be switched to a different output port.

To address this issue, a wavelength converter 366-1 at the optical circuit switch 310-1 converts the incoming optical signal to a different optical signal having the desired wavelength for causing the optical circuit switch 310-1 to switch the optical signal to the desired output port.

The optical signal that leaves the output port 318 of the optical circuit switch 310-1 can be sent to the optical circuit switch 308-*i*. Another wavelength conversion can be performed when this optical signal arrives at the optical circuit switch 308-*i*, because the wavelength of the optical signal may not be the correct wavelength for causing the optical circuit switch 308-*i* to switch the optical signal to the desired output port. In the present example, it is desirable for the optical circuit switch 308-*i* to switch the incoming optical signal from the input port 320 to an output port 322 that is optically coupled to the M$^{th}$ computing node 302-M. A wavelength converter 368-*i* at the optical circuit switch 308-*i* can convert the incoming optical signal to a different optical signal having the desired wavelength for causing the optical circuit switch 308-*i* to switch the optical signal from the input port 320 to the desired output port 322.

FIG. 3 shows the network 300 with a plurality of wavelength converters 366 that couple the optical circuit switches 308 in the first stage 306*a* of the network 300 to the optical circuit switches 310 in the second stage 306*b* of the network 300. In the depicted embodiment, each wavelength converter 366 can couple any of the optical circuit switches 308 in the first stage 306*a* of the network 300 to one of the optical circuit switches 310 in the second stage 306*b* of the network 300. For example, the wavelength converter 366-1 can couple any of the optical circuit switches 308 in the first stage 306*a* of the network 300 to the optical circuit switch 310-1 in the second stage 306*b* of the network 300. Similarly, the wavelength converter 366-2 can couple any of the optical circuit switches 308 to the optical circuit switch 310-2, the wavelength converter 366-3 can couple any of the optical circuit switches 308 to the optical circuit switch 310-3, and the j$^{th}$ wavelength converter 366-*j* can couple any of the optical circuit switches 308 to the optical circuit switch 310-*j*.

FIG. 3 also shows the network 300 with a plurality of wavelength converters 368 that couple the optical circuit switches 310 in the second stage 306*b* of the network 300 to the optical circuit switches 308 in the first stage 306*a* of the network 300. Each wavelength converter 368 can couple any of the optical circuit switches 310 in the second stage 306*b* of the network 300 to one of the optical circuit switches 308 in the first stage 306*a* of the network 300. For example, the wavelength converter 368-1 can couple any of the optical circuit switches 310 in the second stage 306*b* of the network 300 to the optical circuit switch 308-1 in the first stage 306*a* of the network 300. Similarly, the wavelength converter 368-*i* can couple any of the optical circuit switches 310 to the optical circuit switch 308-*i*.

In some embodiments, the wavelength converters 366, 368 can be configured to perform an optical-electrical-optical (O-E-O) conversion. In other words, the wavelength converters 366, 368 can be configured to convert an incoming optical signal to an electrical signal, and then back to a different optical signal having the desired wavelength. Alternatively, in some embodiments, the wavelength converters 366, 368 can be configured to perform wavelength conversion without performing an O-E-O conversion.

In some embodiments, the optical circuit switches 308, 310 can function collectively so that they appear as a single switch 380 from the perspective of the computing nodes 302 in the network 300. Therefore, even though the depicted network 300 includes a plurality of different optical circuit switches 308, 310, all of these optical circuit switches 308, 310 can operate together so that interactions between the computing nodes 302 and the optical circuit switches 308, 310 can occur as if the optical circuit switches 308, 310 were a single network switch 380.

FIGS. 3A-C illustrate the communication path between the first computing node 302-1 and the M$^{th}$ computing node 302-M in greater detail. In particular, FIGS. 3A-C illustrate various components in the network 300 that facilitate communication between the first computing node 302-1 and the M$^{th}$ computing node 302-M.

Reference is initially made to FIG. 3A. To send data to the M$^{th}$ computing node 302-M, the first computing node 302-1 can provide an electrical signal 324 (which includes the data to be sent) to a transceiver 326. The transceiver 326 can convert the electrical signal 324 into an optical signal 328, and send the optical signal 328 to the optical circuit switch 308-1 via an optical communication channel 358. The optical signal 328 can be delivered to an input port 312 of the optical circuit switch 308-1, and the optical signal 328 can have a characteristic (e.g., wavelength) that causes the optical circuit switch 308-1 to switch the optical signal 328 to the appropriate output port. In this example, the optical circuit switch 308-1 can switch the optical signal 328 from the input port 312 to an output port 314 that is optically coupled to the optical circuit switch 310-1 in the second stage 306*b* of the network 300 via an optical communication channel 360.

Reference is now made to FIG. 3B. From the output port 314 of the optical circuit switch 308-1, the optical signal 328 can be sent to the optical circuit switch 310-1 via the optical communication channel 360. When the optical signal 328 arrives at the optical circuit switch 310-1, a wavelength converter 366-1 can convert the optical signal 328 to a different optical signal 340. The optical signal 340 output by the wavelength converter 366-1 can have a different wavelength than the incoming optical signal 328. In particular, the optical signal 328 can be converted into an optical signal 340 that has a desired wavelength for causing the optical circuit switch 310-1 to switch the optical signal to the desired output port, which in this example is the output port 318 that is coupled to the optical circuit switch 308-*i* (which is optically coupled to the M$^{th}$ computing node 302-M). The optical signal 340 can then be delivered to an input port 316 of the optical circuit switch 310-1, and the optical circuit switch 310-1 can switch the optical signal 340 from the input port 316 to the output port 318. The optical signal 340 can be sent to the optical circuit switch 308-*i* via an optical communication channel 362.

Reference is now made to FIG. 3C. From the output port 318 of the optical circuit switch 310-1, the optical signal 340 can be sent to the optical circuit switch 308-*i* via the optical communication channel 362. When the optical signal 340 arrives at the optical circuit switch 308-*i*, a wavelength converter 368-*i* can convert the optical signal 340 to a different optical signal 370. The optical signal 370 output by the wavelength converter 368-*i* can have a different wavelength than the incoming optical signal 340. In particular, the optical signal 340 can be converted into an optical signal 370 that has a desired wavelength for causing the optical circuit switch 308-*i* to switch the optical signal to the desired output port, which in this example is the output port 322 that is coupled to the $M^{th}$ computing node 302-M. The optical signal 370 can then be delivered to an input port 320 of the optical circuit switch 308-*i*, and the optical circuit switch 308-*i* can switch the optical signal 370 from the input port 320 to the output port 322. The optical signal 370 can travel from the output port 322 of the optical circuit switch 308-*i* to the $M^{th}$ computing node 302-M via an optical communication channel 364. When the optical signal 370 arrives at the $M^{th}$ computing node 302-M, a transceiver 354 can convert the optical signal 370 into an electrical signal 356, and this electrical signal 356 can be delivered to the $M^{th}$ computing node 302-M.

The examples shown in FIGS. 1-3 are two-stage networks. However, the techniques disclosed herein are not limited to just two network stages. The present disclosure contemplates the use of N network stages, where the value of N can be any integer that is greater than or equal to two.

Figure 4:
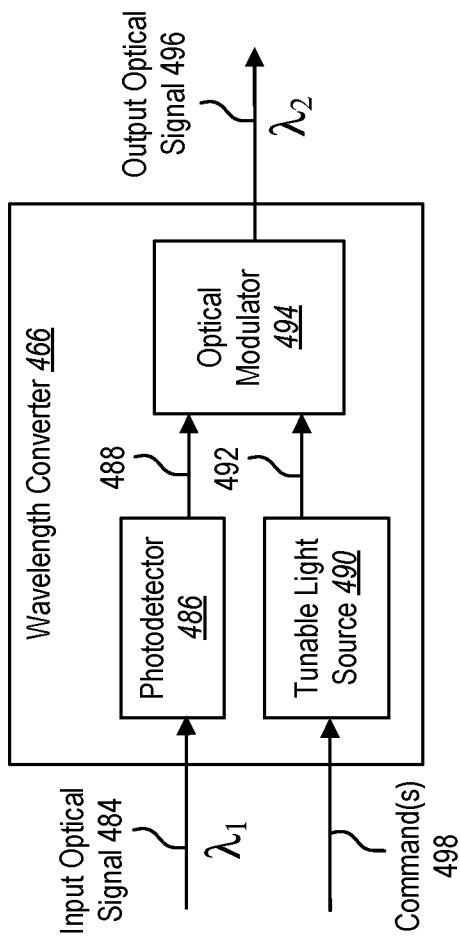
FIG. 4 illustrates an example of a wavelength converter that is configured to perform an optical-electrical-optical conversion.

FIG. 4 illustrates an example of a wavelength converter 466. The wavelength converter 466 represents one possible implementation of the wavelength converters 366, 368 in the network 300. In other words, some or all of the wavelength converters 366, 368 in the network 300 shown in FIG. 3 could be implemented similarly to the wavelength converter 466. In the example shown in FIG. 4, the wavelength converter 466 is configured to perform an optical-electrical-optical (O-E-O) conversion.

The wavelength converter 466 can include a photodetector 486 that is configured to convert the input optical signal 484 to an electrical signal 488. In some embodiments, the wavelength converter 466 can also include circuitry that performs one or more signal processing operations on the electrical signal 488. For example, in some embodiments, the wavelength converter 466 can include an amplifier that amplifies the electrical signal 488. For the sake of simplicity and clarity, this additional circuitry is not shown in FIG. 4.

The wavelength converter 466 can also include a light source 490 that generates an optical signal 492. The light source 490 is tunable to a plurality of different wavelengths. In other words, the wavelength of the optical signal 492 that is output by the light source 490 can be changed. In some embodiments, the tunable light source 490 can be a laser.

The wavelength converter 466 can also include an optical modulator 494. The optical modulator 494 can be configured to modulate the electrical signal 488 that is output by the photodetector 486 onto an output signal generated by the tunable light source 490 to produce an output optical signal 496.

FIG. 4 shows the input optical signal 484 with a first wavelength ($\lambda_1$) and the output optical signal 496 with a second wavelength ($\lambda_2$). The second wavelength ($\lambda_2$) can be different from the first wavelength ($\lambda_1$). In other words, the wavelength converter 466 can convert the input optical signal 484 to another optical signal, the output optical signal 496, that has a different wavelength. However, it is not necessary for the second wavelength ($\lambda_2$) to be different from the first wavelength ($\lambda_1$). Under some circumstances, the second wavelength ($\lambda_2$) can be identical to the first wavelength ($\lambda_1$).

The wavelength of the output optical signal 496 depends on the wavelength of the optical signal 492 generated by the tunable light source 490. FIG. 4 shows command(s) 498 being provided as input to the tunable light source 490. The command(s) 498 can affect the wavelength of the optical signal 492 that is generated by the tunable light source 490. In some embodiments, the command(s) 498 can be provided by a scheduler that is responsible for configuring the circuit switches within the network to enable desired communication paths.

Figure 5:
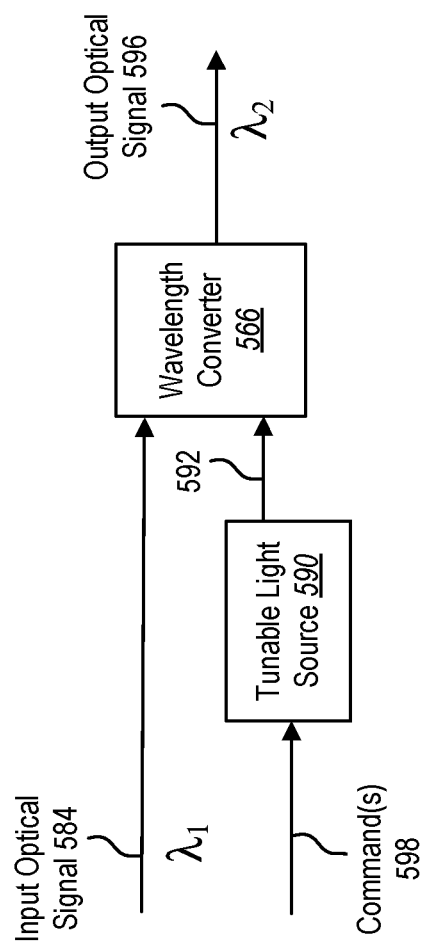
FIG. 5 illustrates an example of a wavelength converter that is configured to perform a wavelength conversion without performing an optical-electrical-optical conversion.

FIG. 5 illustrates another example of a wavelength converter 566. The wavelength converter 566 shown in FIG. 5 represents another possible implementation of the wavelength converters 366, 368 in the network 300. In other words, some or all of the wavelength converters 366, 368 in the network 300 shown in FIG. 3 could be implemented similarly to the wavelength converter 566. The wavelength converter 566 shown in FIG. 5 is different in some respects from the wavelength converter 466 shown in FIG. 4. As discussed above, the wavelength converter 466 shown in FIG. 4 is configured to perform an optical-electrical-optical (O-E-O) conversion as part of performing wavelength conversion. In contrast, the wavelength converter 566 shown in FIG. 5 is configured to perform a wavelength conversion without performing an O-E-O conversion.

A tunable light source 590 (e.g., a laser) can generate an optical signal 592 that is tunable to a plurality of different wavelengths. The wavelength of the optical signal 592 that is generated by the tunable light source 590 can be affected by one or more commands 598 that are shown as inputs to the tunable light source 590. The command(s) 598 can be provided by a scheduler that is responsible for configuring the circuit switches within the network to enable desired communication paths. In FIG. 5, the tunable light source 590 is shown separately from the wavelength converter 566. However, in some embodiments, the tunable light source 590 can be included as part of the wavelength converter 566.

There are many different ways that the wavelength converter 566 can be configured. In some embodiments, the wavelength converter 566 can include a semiconductor optical amplifier (SOA). The SOA can be configured to generate the output optical signal 596 based on the input optical signal 584 and the optical signal 592 that is generated by the tunable light source 590. More specifically, the SOA can be configured to generate the output optical signal 596 by converting the wavelength of the input optical signal 584 to the wavelength of the optical signal 592 generated by the tunable light source 590.

In some embodiments, the wavelength converter 566 can include a plurality of SOAs that operate together to perform wavelength conversion. In some embodiments, one or more SOAs can be used in combination with one or more other optical components to perform wavelength conversion. In some embodiments, the input optical signal 584 can be directly injected into one or multiple stages of the tunable light source 590 in connection with performing wavelength conversion.

As before, FIG. 5 shows the input optical signal 584 with a first wavelength ($\lambda_1$) and the output optical signal 596 with a second wavelength ($\lambda_2$). The second wavelength ($\lambda_2$) can be different from or the same as the first wavelength ($\lambda_1$).

Figure 6:
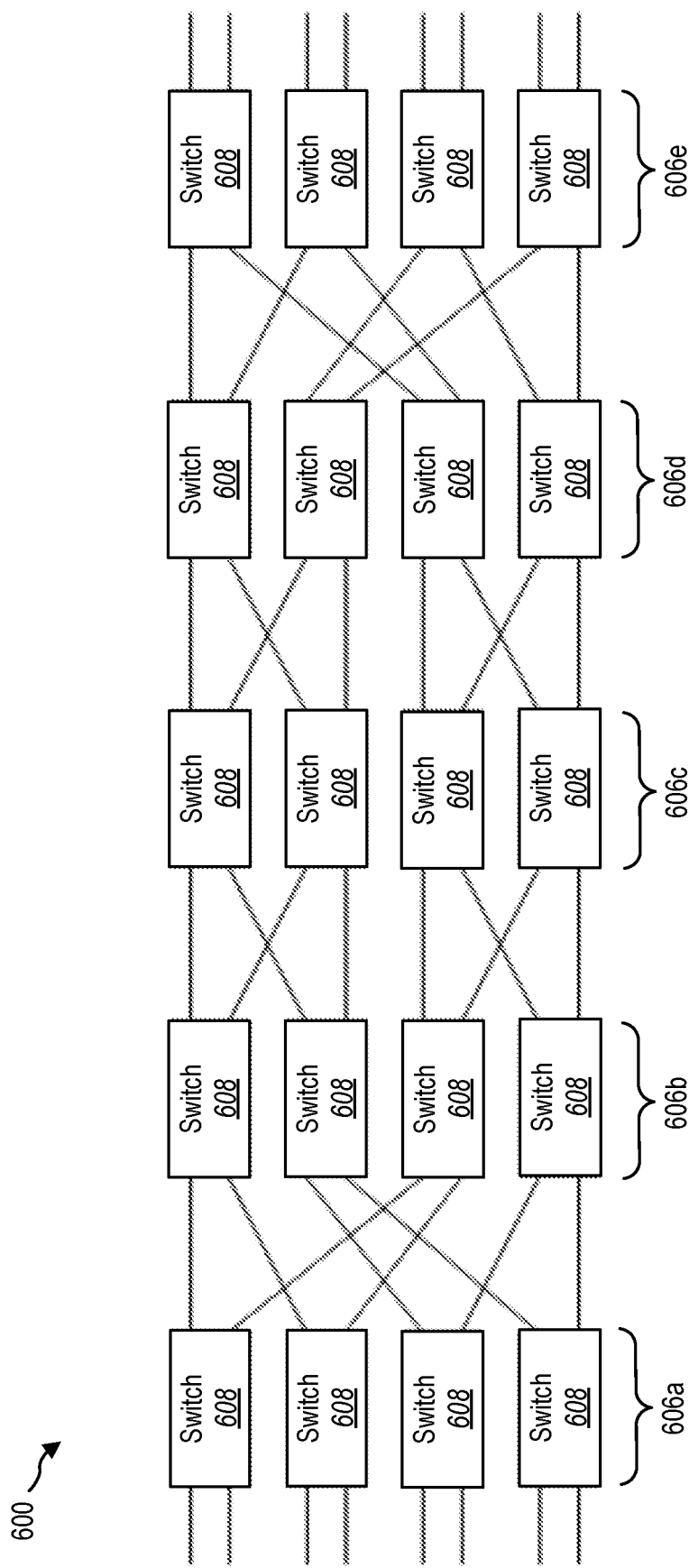
FIG. 6 illustrates an example of a multi-stage network that is implemented in accordance with a Benešnetwork topology.

The examples shown in FIGS. 1-3 utilize Clos network topologies. However, there are many other types of network topologies that can be used in accordance with the present disclosure. For example, in some embodiments a Beneš network topology can be used. FIG. 6 illustrates an example of a Beneš network topology. A network that is implemented in accordance with a Beneš network topology can include 2 $\log_2 N - 1$ stages, with each stage including N/2 2×2 switches, thereby using a total of N $\log_2 N - N/2$ 2×2 switches.

An example of a Beneš network 600 with N=8 is shown in FIG. 6. The network 600 includes 2 $\log_2 8 - 1 = 5$ stages 606*a-e*, each stage including N/2=4 2×2 switches 608. The network 600 uses a total of N log₂N−N/2=20 2×2 switches 608. The central three stages 606b-d include two smaller 4×4 Benešnetworks. In the center stage 606c, each 2×2 switch 608 may be regarded as a 2×2 Benešnetwork.

In some embodiments, all of the switches 608 in the network 600 can be implemented as electrical circuit switches. Alternatively, in some embodiments, all of the switches 608 in the network 600 can be implemented as optical circuit switches. Alternatively still, in some embodiments, some of the switches 608 in the network 600 can be implemented as electrical circuit switches, while other switches 608 in the network 600 can be implemented as optical circuit switches.

Figure 7A:
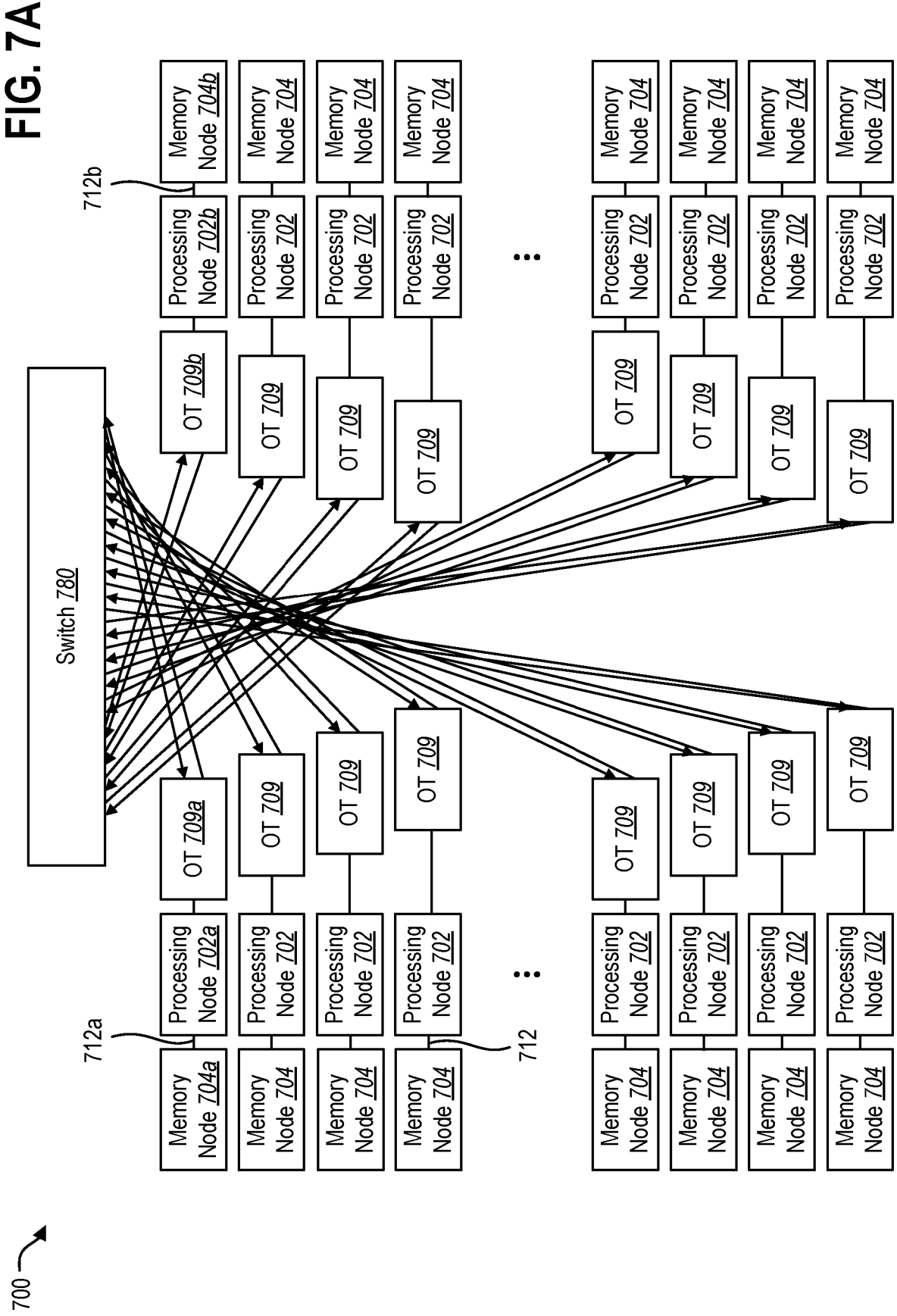
FIGS. 7A-B illustrate an example of a disaggregated computing system that includes a switch configured in accordance with the techniques disclosed herein.
Figure 7B:
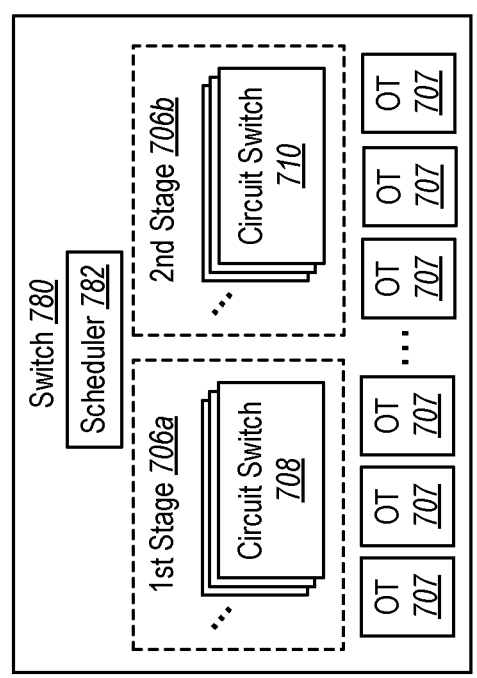

FIGS. 7A and 7B illustrate an example of a system 700 in which the techniques disclosed herein can be utilized. The system 700 is a disaggregated computing system that includes a plurality of computing nodes. In particular, the system 700 is shown with a plurality of processing nodes 702 and a plurality of memory nodes 704.

In the depicted system 700, communication between the various computing nodes (processing nodes 702 and memory nodes 704) can occur via optical communication. Thus, the system 700 includes a plurality of optical transceivers 709 coupled to the computing nodes. The optical transceivers 709 are abbreviated as "OT" in FIGS. 7A and 7B. In some embodiments, communication between the various computing nodes in the system 700 can occur via free-space optical communications. Alternatively, in other embodiments, communication between the various computing nodes in the system 700 can occur via optical cables.

The system 700 also includes a switch 780 that is configured to interconnect the plurality of computing nodes. In some embodiments, the computing nodes can be interconnected to form a network fabric. The switch 780 can be optically coupled to the computing nodes in the system 700. Thus, the switch 780 also includes a plurality of optical transceivers 707 coupled to the computing nodes.

To distinguish the optical transceivers that are coupled to the switch 780 from the optical transceivers that are coupled to the computing nodes, the optical transceivers that are coupled to the switch 780 may be referred to herein as switch optical transceivers 707, and the optical transceivers that are coupled to the computing nodes may be referred to herein as node optical transceivers 709.

In some embodiments, the system 700 can be configured so that for each node optical transceiver 709 there is a corresponding switch optical transceiver 707 at the switch 706 that is optically coupled to the node optical transceiver 709. Optical communications that are sent by a particular node optical transceiver 709 can be received by the corresponding switch optical transceiver 707, and vice versa.

In some embodiments, the switch 780 can be implemented as any of the switches 180, 280, 380 described previously. Thus, in some embodiments, the switch 780 can include a plurality of circuit switches 708, 710. By interconnecting the computing nodes, the switch 780 forms a network of computing nodes. The circuit switches 708, 710 can be arranged in a hierarchical topology that includes N stages, where the value of N can be greater than or equal to two. In embodiments where the value of N is two, the switch 780 can include a first plurality of circuit switches 708 that form a first stage 706a of the network, and a second plurality of circuit switches 708 that form a second stage 706b of the network. In some embodiments, both the circuit switches 708 in the first stage 706a of the network and the circuit switches 710 in the second stage 706b of the network can be implemented as electrical circuit switches (as in the embodiment shown in FIG. 1). In some embodiments, the circuit switches 708 in the first stage 706a of the network can be implemented as optical circuit switches, and the circuit switches 710 in the second stage 706b of the network can be implemented as electrical circuit switches (as in the embodiment shown in FIG. 2). In some embodiments, both the circuit switches 708 in the first stage 706a of the network and the circuit switches 710 in the second stage 706b of the network can be implemented as optical circuit switches (as in the embodiment shown in FIG. 3).

FIG. 7B shows the switch 780 with a scheduler 782. The scheduler 782 can be configured to configure the circuit switches 708, 710 to enable communication paths among the computing nodes in the system 700. The scheduler 782 can be implemented based on any of the scheduling mechanisms discussed previously.

The switch 780 can be coupled to the switch optical transceivers 707. In some embodiments, the switch 780 can be electrically coupled to the switch optical transceivers 707. In some embodiments, the switch 780 can be optically coupled to the switch optical transceivers 707. In FIG. 7B, the switch optical transceivers 707 are shown as being part of the switch 780. In some alternative embodiments, however, the switch optical transceivers 707 can be separate from (and still coupled to) the switch 780.

As noted above, the switch 780 can be configured to interconnect the computing nodes in the system 700. In other words, different computing nodes (e.g., processing nodes 702, memory nodes 704) can communicate with each other through the switch 780.

For example, consider a scenario in which a first processing node 702a sends some type of communication to a second processing node 702b. In some embodiments, a first node optical transceiver 709a that is electrically coupled to the first processing node 702a can generate a modulated light beam that includes the information that should be communicated to the second processing node 702b. The first node optical transceiver 709a can transmit the modulated light beam to the switch optical transceiver 709 corresponding to the first node optical transceiver 709a. Through any of the techniques disclosed herein, the switch 780 can receive the optical signal from the first processing node 702a and cause another optical signal carrying the information to be sent to the second processing node 702b. The switch optical transceiver 709 corresponding to the second node optical transceiver 709b can transmit the optical signal carrying the information to the second node optical transceiver 709b.

As indicated above, in some embodiments the switch 780 can interconnect the computing nodes to form a network fabric. The network fabric formed by the node optical transceivers 709, the switch optical transceivers 707, and the switch 780 enables all of the computing nodes to be accessible to one another. For example, all of the memory nodes 704 can be accessible to all of the processing nodes 702 via the network fabric.

More specifically, in the system 700 shown in FIGS. 7A and 7B, each processing node 702 is electrically coupled to a memory node 704 via a direct electrical connection 712. A direct electrical connection 712 between a processing node 702 and a memory node 704 can be, for example, a wired connection. A processing node 702 can access the memory node 704 to which it is electrically coupled via this direct electrical connection 712. For example, the first processing node 702a can access the first memory node 704a via a direct electrical connection 712a between the first processing node 702a and the first memory node 704a. Similarly, the second processing node 702b can access the second memory node 704b via a direct electrical connection 712b between the second processing node 702b and the second memory node 704b.

In the depicted system 700, however, the processing nodes 702 are not electrically coupled to all of the memory nodes 704. In other words, there is not a direct electrical connection (e.g., a wired connection) between each processing node 702 and all of the memory nodes 704 in the system 700. For example, it is not possible for the first processing node 702a to access the second memory node 704b via a direct electrical connection. Similarly, it is not possible for the second processing node 702b to access the first memory node 704a via a direct electrical connection.

Although there is not a direct electrical connection between each processing node 702 and all of the memory nodes 704, the network fabric that is formed by the node optical transceivers 709, the switch optical transceivers 707, and the switch 780 makes all of the memory nodes 704 accessible to all of the processing nodes 702. For example, the first processing node 702a can access the second memory node 704b (as well as all of the other memory nodes 704 in the system 700) via the network fabric. Similarly, the second processing node 702b can access the first memory node 704a (as well as all of the other memory nodes 704 in the system 700) via the network fabric. Therefore, even though the processing nodes 702 are not electrically coupled to all of the memory nodes 704 in the system 700, the processing nodes 702 are either electrically coupled or optically coupled to all of the memory nodes 704 in the system 700.

The system 700 shown in FIGS. 7A and 7B is provided for purposes of example only, and the specific characteristics of the system 700 should not be interpreted as limiting the scope of the present disclosure. The techniques disclosed herein can be utilized in other systems with characteristics that are different from those in the depicted system 700.

For example, in the depicted system 700, one node optical transceiver 709 is coupled to each processing node 702. In some embodiments, however, more than one node optical transceiver 709 can be coupled to each processing node 702. Similarly, there can be more than one switch optical transceiver 707 that corresponds to each processing node 702 (or other type of computing node).

As another example, only processing nodes 702 and memory nodes 704 are shown in the depicted system 700. In alternative embodiments, however, other types of computing nodes (e.g., storage nodes) can be utilized.

As another example, in the depicted system 700 each processing node 702 is electrically coupled (e.g., has a direct electrical connection 712) to only one memory node 704. In alternative embodiments, however, at least some processing nodes can be electrically coupled to more than one memory node and/or not be electrically coupled to any separate memory nodes.

As another example, the depicted system 700 is a disaggregated computing system in which computing resources are separated into dedicated nodes (e.g., processing nodes 702, memory nodes 704). However, the scope of the present disclosure is not limited to disaggregated computing systems. The techniques disclosed herein for interconnecting computing nodes can be implemented in a system that includes a plurality of traditional servers.

In some embodiments, an "electrical circuit switch" can refer to any circuit switch implemented with electrical components. In some embodiments, an "optical circuit switch" can refer to any circuit switch implemented with optical components.

In some embodiments, a "network fabric" refers to a computer network architecture in which a plurality of computing systems or computing nodes are interconnected. In some embodiments, the computing systems or computing nodes in a network fabric can be interconnected using routers, switches, and other kinds of network components. In some embodiments, the computing systems or computing nodes in a network fabric can be interconnected in a way that provides low latency and/or high bandwidth interconnections between the various computing systems or computing nodes. In some embodiments, the computing systems or computing nodes in a network fabric can be interconnected using relatively few layers (e.g., two or three layers). This essentially flattens the network architecture, thereby reducing the distance between endpoints.

In some embodiments, two components are "coupled" if they are electrically coupled, optically coupled, or mechanically coupled.

In some embodiments, two components are "electrically coupled" if electrical current can flow from one component to another. In some embodiments, two electrically coupled components can be in direct contact with each other such that current flows from the one component directly to the other component. However, this is not required. In some embodiments, two electrically coupled components may not be in direct contact with each other. There may be any number of other conductive materials and components disposed electrically between two components that are electrically coupled so long as current can flow therebetween.

In some embodiments, two optical components are "optically coupled" if there is an optical path between the two optical components. Thus, in such embodiments, a first optical component (e.g., a node optical transceiver 509) can be considered to be optically coupled to a second optical component (e.g., a switch optical transceiver 507) if an optical transmission sent by the first component is received by the second optical component.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The described embodiments are to be considered as illustrative and not restrictive, and the present disclosure may be embodied in other forms besides those specifically described herein. The scope of the disclosure is, therefore, indicated by the appended claims rather than by the foregoing description. Changes that come within the meaning and range of equivalency of the claims are to be embraced within their scope.

What is claimed is:

1. A system for interconnecting a plurality of computing nodes, comprising:
a plurality of optical circuit switches;
a plurality of electrical circuit switches;
a first network stage comprising a first plurality of circuit switches selected from among the plurality of optical circuit switches and the plurality of electrical circuit switches, wherein each computing node among the plurality of computing nodes is optically coupled to at least one of the first plurality of circuit switches; and
a second network stage comprising a second plurality of circuit switches selected from among the plurality of optical circuit switches and the plurality of electrical circuit switches, wherein each circuit switch among the first plurality of circuit switches is optically coupled to each circuit switch among the second plurality of circuit switches.

2. The system of claim 1, wherein:
the first plurality of circuit switches comprises the plurality of optical circuit switches; and
the second plurality of circuit switches comprises the plurality of electrical circuit switches.

3. The system of claim 1, wherein:
the first plurality of circuit switches comprises the plurality of electrical circuit switches; and
the second plurality of circuit switches comprises the plurality of optical circuit switches.

4. The system of claim 1, wherein each optical circuit switch among the plurality of optical circuit switches is configured to switch an input optical signal from an input port to an output port based on an optical characteristic of the input optical signal.

5. The system of claim 1, wherein:
the plurality of computing nodes comprise a plurality of disaggregated computing nodes; and
the plurality of disaggregated computing nodes comprise pools of processing nodes and memory nodes.

6. The system of claim 1, wherein:
the plurality of computing nodes are located in a single rack within a datacenter; and
the plurality of computing nodes are interconnected to form an intra-rack network.

7. The system of claim 1, further comprising a plurality of optical transceivers, wherein each circuit switch among the first plurality of circuit switches is coupled to at least one optical transceiver.

8. The system of claim 1, wherein optical communications between the plurality of computing nodes and the first plurality of circuit switches and between the first plurality of circuit switches and the second plurality of circuit switches occur via free-space optical communications.

9. The system of claim 1, further comprising:
a first plurality of optical cables that couple the plurality of computing nodes to the first plurality of circuit switches; and
a second plurality of optical cables that couple the first plurality of circuit switches to the second plurality of circuit switches.

10. The system of claim 1, further comprising a scheduler that configures the first plurality of circuit switches and the second plurality of circuit switches to enable communication paths among the plurality of computing nodes.

11. A system for interconnecting a plurality of computing nodes, comprising:
a plurality of node optical transceivers that are electrically coupled to at least some of the plurality of computing nodes; and
a switch that is optically coupled to the plurality of node optical transceivers, the switch comprising:
a plurality of optical circuit switches;
a plurality of electrical circuit switches;
a first network stage comprising a first plurality of circuit switches selected from among the plurality of optical circuit switches and the plurality of electrical circuit switches, wherein each computing node among the plurality of computing nodes is optically coupled to at least one of the first plurality of circuit switches; and
a second network stage comprising a second plurality of circuit switches selected from among the plurality of optical circuit switches and the plurality of electrical circuit switches, wherein each circuit switch among the first plurality of circuit switches is optically coupled to each circuit switch among the second plurality of circuit switches.

12. The system of claim 11, wherein:
the first plurality of circuit switches comprises the plurality of optical circuit switches; and
the second plurality of circuit switches comprises the plurality of electrical circuit switches.

13. The system of claim 11, wherein:
the first plurality of circuit switches comprises the plurality of electrical circuit switches; and
the second plurality of circuit switches comprises the plurality of optical circuit switches.

14. The system of claim 11, wherein:
the plurality of computing nodes comprise a plurality of disaggregated computing nodes; and
the plurality of disaggregated computing nodes comprise pools of processing nodes and memory nodes.

15. The system of claim 11, wherein:
the switch further comprises a plurality of switch optical transceivers; and
each circuit switch among the first plurality of circuit switches is coupled to at least one switch optical transceiver.

16. A system for interconnecting a plurality of computing nodes to form a circuit-switched network, comprising:
a first plurality of optical circuit switches that form a first stage of the circuit-switched network, wherein each computing node among the plurality of computing nodes is optically coupled to an optical circuit switch among the first plurality of optical circuit switches;
a second plurality of optical circuit switches that form a second stage of the circuit-switched network, wherein each optical circuit switch among the second plurality of optical circuit switches is optically coupled to each optical circuit switch among the first plurality of optical circuit switches; and
a plurality of wavelength converters that couple the first plurality of optical circuit switches to the second plurality of optical circuit switches, each wavelength converter being configured to convert an input optical signal to an output optical signal having a desired wavelength.

17. The system of claim 16, wherein each wavelength converter comprises:
a photodetector that is configured to convert the input optical signal to an electrical signal;

a light source that is tunable to a plurality of different wavelengths; and an optical modulator that is configured to modulate the electrical signal onto an output signal generated by the light source to produce the output optical signal.

18. The system of claim 16, wherein at least some of the plurality of wavelength converters are configured to perform wavelength conversion without performing an optical-electrical-optical conversion.

19. The system of claim 16, wherein:

the plurality of computing nodes comprise a plurality of disaggregated computing nodes located in a rack within a datacenter; and the plurality of disaggregated computing nodes comprise pools of processing nodes and memory nodes.

20. The system of claim 16, wherein each optical circuit switch among the first plurality of optical circuit switches and the second plurality of optical circuit switches:

comprises a plurality of input ports and a plurality of output ports; and is configured to switch an incoming optical signal from an input port to an output port based on a wavelength of the incoming optical signal.

\* \* \* \* \*